US012800537B2

(12) United States Patent
Thibault

(10) Patent No.: US 12,800,537 B2
(45) Date of Patent: Nov. 17, 2026

(54) DEVICE FOR CHARACTERIZING A MEDIUM BY CAPACITANCE SPECTROSCOPY

(71) Applicants: UNIVERSITE GRENOBLE ALPES, Saint Martin d'Heres (FR); CENTRE NATIONAL DE LA RECHERCHE SCIENTIFIQUE, Paris (FR)

(72) Inventor: Pierre Thibault, Saint-Martin-d'Uriage (FR)

(73) Assignees: UNIVERSITE GRENOBLE ALPES, Saint Martin d'Heres (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 156 days.

(21) Appl. No.: 18/724,746

(22) PCT Filed: Dec. 22, 2022

(86) PCT No.: PCT/EP2022/087480
§ 371 (c)(1),
(2) Date: Jun. 27, 2024

(87) PCT Pub. No.: WO2023/126303
PCT Pub. Date: Jul. 6, 2023

(65) Prior Publication Data

US 2025/0067699 A1 Feb. 27, 2025

(30) Foreign Application Priority Data

Dec. 31, 2021 (FR) ...................................... 2114736

(51) Int. Cl.
*G01N 27/22* (2006.01)
*G01F 23/263* (2022.01)

(52) U.S. Cl.
CPC ......... *G01N 27/228* (2013.01); *G01F 23/266* (2013.01)

(58) Field of Classification Search
CPC ...... G01F 23/268; G01F 23/80; G01F 23/266; G01F 25/20; G01N 27/228
See application file for complete search history.

(56) References Cited

U.S. PATENT DOCUMENTS 6,380,747 B1 * 4/2002 Goldfine ............ G01R 27/2623 324/238
6,433,560 B1 * 8/2002 Hansen ................ G01F 23/266 324/668

(Continued)

FOREIGN PATENT DOCUMENTS

WO 9917124 A1 4/1999
WO 03019119 A1 3/2003
WO 2019116043 A1 6/2019

OTHER PUBLICATIONS

International Search Report and Written Opinion issued in corresponding International Application No. PCT/EP2022/087480, mailed Mar. 22, 2023, European Patent Office, Rijswijk, Netherlands, pp. 1-13.

(Continued)

*Primary Examiner* — Eman A Alkafawi
*Assistant Examiner* — Suresh K Rajaputra
(74) *Attorney, Agent, or Firm* — HAUPTMAN HAM, LLP

(57) ABSTRACT

A device for characterizing a medium MUT by capacitance spectroscopy and applies, according to its different aspects, to at least partially-conductive media. The conductivity σ of the medium to be characterized may be deduced from the measurement of the equivalent electrical capacitance $C_x$ and/or the equivalent conductance $G_x$, by means of a model of the electrical behaviour of the medium to be characterized (Continued)

relating said measurements both to the complex dielectric permittivity $\varepsilon^*(\omega)$ of the medium to be characterized and to the involved electrode surfaces.

28 Claims, 23 Drawing Sheets

(56) References Cited

U.S. PATENT DOCUMENTS

| | | | | |
|---|---|---|---|---|
| 6,486,673 | B1 * | 11/2002 | Goldfine | G01V 3/088 324/688 |
| 2008/0042658 | A1 * | 2/2008 | Getman | G01F 23/263 324/681 |
| 2011/0107833 | A1 | 5/2011 | Thibault | |
| 2011/0316563 | A1 | 12/2011 | Davies et al. | |
| 2013/0328572 | A1 * | 12/2013 | Wang | A61B 5/7203 324/601 |
| 2014/0154004 | A1 | 6/2014 | Agate | |

OTHER PUBLICATIONS

Cole, K., "Permeability and Impermeability of Cell Membranes for Ions," Cold Spring Harb Symp Quant Biol 1940, 8: 110-122.

Cole et al., K., "Dispersion and Absorption in Dielectrics I. Alternating Current Characteristics," The Journal of Chemical Physics, vol. 9, 1941, 341-351.

Davey et al., C.L., "The influence of electrode polarisation on dielectric spectra, with special reference to capacitive biomass measurements I. Quantifying the effects on electrode polarisation of factors likely to occur during fermentations," Bioelectrochemistry and Bioenergetics, 46, 1998, 91-103.

Grimnes et al., S., "Bioimpedance and Bioelectricity Basics," Second Edition, Academic Press, 2008, 484 pages (relevant pages related to the invention are pp. 30-33; pp. 89-90 and p. 253).

Hu et al., X., "Planar capacitive sensors—designs and applications," Sensor Review, vol. 30, No. 1, 2010, 24-39.

Macdonald, D.D., "Reflections on the history of electrochemical impedance spectroscopy," Electrochimica Acta 51, 2006, 1376-1388.

Mamishev et al., A.V., "Optimization of Multi-Wavelength Interdigital Dielectrometry Instrumentation and Algorithms," IEEE Transactions on Dielectrics and Electrical Insulation, vol. 5, No. 3, Jun. 1998, 408-420.

Segalen et al., C., "Electrical and rheological properties of sewage sludge—Impact of the solid content," Water Research, 82, 2015, 25-36.

Yang, W.Q., "Hardware design of electrical capacitance tomography systems," Meas. Sci. Technol. 7, 1996, 225-232.

* cited by examiner

DEVICE FOR CHARACTERIZING A MEDIUM BY CAPACITANCE SPECTROSCOPY

The present application is a U.S. National Phase of International Application Number PCT/EP2022/087480, filed Dec. 22, 2022, which claims priority to French Application No. 2114736, filed Dec. 31, 2021.

TECHNICAL FIELD

The invention relates to the technical field of devices and systems for characterising a medium by capacitance spectroscopy.

The invention finds a particular application in measuring the quality of a partially electrically-conductive medium or the level of such a medium (for example the height) when placed in a container, such as for example a tank or a pipe. A tank-type container may be a fixed reservoir used in an industrial process (bioreactor, food vessel) or a mobile reservoir belonging to a mobile transport apparatus (for example, a motor vehicle, an aircraft, a boat). A pipe-type container may be a pipe (for example a hose) through which the studied medium flows and the ions or any suspended particles that it transports.

The measurement of the quality and/or level of a partially electrically-conductive medium is an major concern in terms of safety and on an economic perspective, for example to monitor the quality of a water intended for consumption, or the evolution of a process in an industrial process (bioreactor for cell multiplication, yeast concentration, etc.), or to prevent failures due to lack of fuel supply or due to an adulterated fuel, or to anticipate the needs for resupplying a tank for the implementation of an industrial process.

PRIOR ART

A system for characterising a dielectric medium by capacitance spectroscopy known from the prior art, in particular from the document by X. Hu et al., "*Planar capacitive sensors—designs and applications*", Sensor Review, vol. 30, no. 1, pp. 24-39, 2010 (hereinafter D1), includes (cf. FIG. 7 of D1):

- an excitation electrode and a measurement electrode, covered with an insulating film, and forming a capacitor;
- a ground electrode, defining a reference electrical potential, in direct contact with the studied medium.

Such a system of the prior art is not fully satisfactory to the extent that, for a partially electrically-conductive medium at a considered excitation frequency, there is a path for electric currents not only between the excitation electrode and the measurement electrode, but also electric currents between the excitation electrode and the reference electrode (where appropriate through the insulating film, by circumventing the system laterally, "the higher the values of permittivity or conductivity, the more the field lines are drawn to the grounded boundary", D1, p. 30). Yet, such electric currents between the excitation electrode and the reference electrode are ignored in the interpretation of the measured values of the electrical capacitance and of the conductance of the studied medium, which might lead to erroneous characterisations of the medium.

Another system for characterising a dielectric medium by capacitance spectroscopy is known from the patent document U.S. Pat. No. 8,393,209 B2. In this system, the interdigitated planar capacitors function only because the currents to the ground increase proportionally at the level of the liquid when the liquid is non-conductive: it is thus possible to do without it through a calibration based on two known situations (full/empty tank for example), but also by using a capacitor in the bottom portion which is always immersed. When the medium is partially conductive, this is no longer true since all couplings to the ground contribute. It should be understood that such a system is therefore ineffective, or at least unsatisfactory, for characterising a medium that is partially electrically-conductive by capacitance spectroscopy, like, for example, in the limit case of narrow and high electrodes, spaced apart from one another and arranged along the vertical walls of a tank containing a conductive liquid.

DISCLOSURE OF THE INVENTION

The invention aims to overcome all or part of the aforementioned drawbacks.

More particularly, the invention aims to overcome the drawback according to which the characterisation of a partially electrically-conductive medium by capacitance spectroscopy using the systems of the prior art is most often affected by the disturbances related to the inconstant and variable leakage currents within the medium and to coupling with the outside (electrostatically charged operator, conductors at some potentials, etc.); the measurement is then non-reproducible and/or likely to be disturbed.

To this end, a first aspect of the invention relates to a device for characterising a medium MUT by capacitance spectroscopy, comprising:

- an excitation electrode and a measurement electrode, each having a determined geometry and intended to be arranged relative to one another so as to form a capacitor,
- a reference electrode having a determined geometry and defining a reference electrical potential $V_g$,
- control electronics configured to apply an electrical potential $V_d$ to the excitation electrode, and
- an electronic measurement circuit having a virtual ground $V_0$ directly connected to the measurement electrode;

The characterisation device being such that:

The excitation, measurement and reference electrodes are intended to be arranged relative to one another and relative to the medium MUT intended to be characterised according to an arrangement such that:

- The control electronics are configured to make the electrical potential Vd at the excitation electrode vary over time with a pulsation ω selected so that the medium MUT intended to be characterised is at least partially electrically-conductive, or in a more limiting manner partially electrically-conductive;
- The excitation and measurement electrodes are arranged so as to enable a first electric current, denoted $i_1$-$i_g$, to circulate therebetween via the medium MUT, and
- The excitation and reference electrodes are arranged so as to enable a second electric current, denoted $i_g$, to circulate therebetween via the medium MUT;

So that at least one amongst the following capacitive couplings is created:

- a capacitive coupling $C_{dm}$ between the excitation electrode and the medium MUT,
- a capacitive coupling $C_{ms}$ between the measurement electrode and the medium MUT, and
- a capacitive coupling $C_{mg}$ between the reference electrode and the medium MUT;

The characterisation device being further such that:

The electronic measurement circuit is configured to measure physical quantities representative of a current, denoted is, originating from the excitation electrode and reaching the measurement electrode;

And in that it further comprises:

a calculation unit configured to calculate at least one amongst an equivalent electric capacitance value, denoted $C_x$, and an equivalent conductance value, denoted $G_x$, between the excitation and measurement electrodes, at least from the physical quantities measured by the measurement electronic circuit; and a processing unit configured to process each value which, amongst the values of the equivalent electric capacitance $C_x$ and the equivalent conductance $G_x$, has been calculated by the calculation unit, to determine at least one amongst a capacitance value $C_m$ of the medium MUT at the measurement electrode and a capacitance value $C_{mm}$ of the medium MUT at the reference electrode and/or at least one amongst a conductance value $G_m$ of the medium MUT at the measurement electrode and a conductance value $G_{mm}$ of the medium MUT at the reference electrode, by solving a system of at least one equation built based on a modelling of the electrical behaviour of a characterisation system comprising at least the characterisation device, each equation interconnecting:

a determined one of the values which, amongst the values of the equivalent electric capacitance $C_x$ and the equivalent conductance $G_x$, has been calculated by the calculation unit, at least that one amongst the capacitance $C_m$ of the medium MUT at the measurement electrode and the capacitance $C_{mm}$ of the medium MUT at the reference electrode is to be determined, at least the highest value amongst a value of the capacitive coupling $C_{dm}$ created between the excitation electrode and the medium MUT, a value of the capacitive coupling $C_{ms}$ created between the measurement electrode and the medium MUT and a value of the capacitive coupling $C_{mg}$ created between the reference electrode and the medium MUT, a pulsation value ω of the electrical potential $V_d$ at the excitation electrode, and a conductivity σ of the medium MUT to be characterised.

at least one amongst the characterisation device and the characterisation system having been calibrated beforehand for said determined geometries of the electrodes and said arrangement.

Thus, the invention according to its different aspects advantageously applies to at least partially conductive, or at least partially conductive, media, which is expressed, as explained hereinbelow, through their complex dielectric permittivity $$\varepsilon^*(\omega) = \varepsilon' - j\varepsilon''(\omega) = \varepsilon' + \frac{\sigma}{j\omega}$$

where σ is the conductivity of the studied medium MUT and ω is the pulsation of the signal applied to the studied medium.

At least one capacitive coupling created between two electrodes among the reference, measurement and excitation electrodes being significant, at least one amongst the first electric current $i_1$-$i_g$ and the second electric current denoted $i_g$ depends on the properties of the medium and is sufficiently significant to influence the values of the equivalent electrical capacitance $C_x$ and of the equivalent conductance $G_x$ measured by the electronic measurement circuit. This influence being modelled, the processing unit allows taking account thereof to obtain a more reliable characterisation of the studied medium MUT in comparison with the prior art, when the medium is at least partially electrically-conductive at the pulsation ω of the electrical potential at the excitation electrode.

The geometry of the electrodes is also taken into account by the processing unit via the prior calibration of the device or of the characterisation system. It should also be noted that the modelling of the electrical behaviour of the characterisation system, and, where appropriate, its calibration, may be done by an artificial intelligence algorithm, based, for example, on very simple initial modelling. In this manner, the characterisation device according to the first aspect of the invention could be made operative, in a relatively easy manner, even when arranged on a tank with a variable shape and/or dimensions, for example in a flexible manner.

Thus, such a device according to the first aspect of the invention allows predictably relating an arrangement and geometries of electrodes to measurements of equivalent electrical capacitance $C_x$ and/or of equivalent conductance $G_x$, according to a deterministic and, where appropriate, evolutionary algorithm.

Moreover, and advantageously, by providing for significant capacitive coupling between the reference electrode and the medium to be characterised, for example by coating the reference electrode with a dielectric material, so that the reference electrode is not in direct conductive contact with the studied medium, the device according to the first aspect of the invention allows getting rid of a charge transfer resistance between the studied medium and the reference electrode; the modelling being particularly simplified. Nonetheless, and in particular thanks to the use of artificial intelligence, the characterisation device according to the first aspect of the invention could alternatively be adapted to take account of the existence of such a charge transfer resistance, for example due to the absence of a dielectric coating on the reference electrode.

Thus, the invention according to its first aspect could allow, when the values of the capacitance $C_m$ of the medium MUT are determined at the measurement electrode and of the capacitance $C_{mm}$ of the medium MUT at the reference electrode or equivalently the values of the conductance $G_m$ of the medium MUT at the measurement electrode and of the conductance $G_{mm}$ of the medium MUT at the reference electrode, determining the conductivity σ of the studied medium MUT which could be deduced indirectly from the measurement of the complex capacitance $C^*(\omega)$, the latter depending on both the complex dielectric permittivity $\varepsilon^*(\omega)$, but also on the surfaces forming the capacitors. Indeed, the complex capacitance $C^*(\omega)$ is that one to which equivalent electrical models are confronted, defined in particular by the equivalent electrical capacitance $C_x$ and the equivalent conductance $G_x$, which could describe the involved phenomena, and which could be expressed in particular in the form of an equation or of a system of equations to be solved.

Alternatively or complementarily, the invention according to its first aspect could allow, when at least the value of the capacitance $C_m$ of the medium MUT is determined at the measurement electrode or equivalently the value of the conductance $G_m$ of the medium MUT at the measurement electrode, from at least one amongst the values of the equivalent electrical capacitance $C_x$ and of the equivalent conductance $G_x$, determining a level of the studied medium MUT, for example when the medium is contained in a recipient on which the device according to the first aspect of the invention is arranged.

According to one example, said at least one equation of said system is further dependent on a mutual capacitance value $C_{ds}$ between the excitation electrode and the measurement electrode.

According to another example, the processing unit may further be configured to determine values representative of the complex dielectric permittivity ε*(ω) of the medium MUT, according to each amongst the capacitance value $C_m$ of the medium MUT at the measurement electrode and the capacitance value $C_{mm}$ of the medium MUT at the reference electrode having been determined and/or according to each amongst the conductance value $G_m$ of the medium MUT at the measurement electrode and the conductance value $G_{mm}$ of the medium MUT at the reference electrode having been determined, from the values of the equivalent electrical capacitance $C_x$ and of the equivalent conductance $G_x$.

The device according to this example allows accessing the complex dielectric permittivity ε*(ω) in the most general case, where currents both between the excitation and measurement electrodes and between the excitation and reference electrodes, are involved. This situation allows accessing dependencies of ε*(ω) which are more complex than that one given by the formula:

$$\varepsilon' + \frac{\sigma}{j\omega},$$

which is the case for example of media with uniformly distributed biological cells, or suspensions of conductive particles, etc.

According to another example, the processing unit is further configured to determine, according to at least one amongst the capacitance value $C_m$ of the medium MUT at the measurement electrode and the capacitance value $C_{mm}$ of the medium MUT at the reference electrode having been determined and/or according to at least one amongst the conductance value $G_m$ of the medium MUT at the measurement electrode and the conductance value $G_{mm}$ of the medium MUT at the reference electrode having been determined from at least one of the values of the equivalent electrical capacitance $C_x$ and of the equivalent conductance $G_x$, at least one value representative of a contact surface between:

- at least one amongst the excitation, measurement and reference electrodes, in particular the measurement electrode, and
- the medium MUT.

Thus, a conferred advantage is to enable measurement of a level of the studied medium MUT, for example when the medium is contained in a container on which the device according to the first aspect of the invention is arranged.

According to another example, the reference electrode is coated with a dielectric material so as to create the capacitive coupling $C_{mg}$ between the reference electrode and the medium MUT; and the processing unit is configured to process each value which, amongst the values of the equivalent electric capacitance $C_x$ and the equivalent conductance $G_x$, has been calculated by the calculation unit, at least according to the value of the capacitive coupling $C_{mg}$ between the reference electrode and the medium MUT created by coating, with the dielectric material, the reference electrode.

Thus, we advantageously get rid of a charge transfer resistance between the studied medium and the reference electrode which would disturb the measurements.

According to another example, at least one amongst the excitation electrode and the measurement electrode may be coated with a dielectric material, so as to create, respectively, the capacitive coupling $C_{dm}$ between the excitation electrode and the medium MUT and the capacitive coupling $C_{ms}$ between the measurement electrode and the medium MUT; and the processing unit is configured to process each value which, amongst the values of the equivalent electric capacitance $C_x$ and the equivalent conductance $G_x$, has been calculated by the calculation unit, at least according to the value of each capacitive coupling which, amongst the capacitive coupling $C_{dm}$ between the excitation electrode and the medium MUT and the capacitive coupling $C_{ms}$ between the measurement electrode and the medium MUT, has been created by coating, with the dielectric material, a corresponding one amongst the excitation electrode and the measurement electrode.

Thus, we advantageously get rid of a potential charge transfer resistance between the studied medium and the coated electrode, which would disturb the measurements and the measurements. Thus, we get rid of the influence of phenomena of wearing, in particular by oxidation, of the excitation and measurement electrodes; the measurements are better controlled, and their reproducibility is further improved.

As mentioned hereinabove, the invention according to its different aspects advantageously applies to at least partially conductive, or at least partially conductive, media, which is expressed, in the manner set out hereinbelow, through their complex dielectric permittivity $$\varepsilon^*(\omega) = \varepsilon' - j\varepsilon''(\omega) = \varepsilon' + \frac{\sigma}{j\omega}$$

where σ is the conductivity of the studied medium MUT and ω is the pulsation of the signal applied on the studied medium, with ω=2πf, where f is the frequency of the electrical potential $V_d$ applied at the excitation electrode.

Definitions

By "at least partially electrically-conductive", it should be understood that the medium meets ε"(ω)/ε'>0, or preferably ε'(ω)/ε'>0.001, where ε' and ε"(ω) are respectively the real part and the imaginary part of the complex dielectric permittivity of the studied medium, for a pulsation ω of the electrical potential at the excitation electrode. Hence, this limitation excludes perfectly dielectric MUT media, or media that could be considered as such, in good approximation, at the frequency f of the electrical potential $V_d$ applied at the excitation electrode. As non-limiting examples, for an excitation frequency f comprised between 0.1 Hz to 10 MHz, an at least partially electrically-conductive medium may have an electrical conductivity higher than or equal to 1 μS/cm, preferably higher than or equal to 10 μS/cm, more preferably higher than or equal to $10^2$ μS/cm. Hence, such a medium is not purely dielectric; it may comprise one or more liquid(s) and/or solid element(s) in dispersed form or separated by membranes.

By "partially electrically conductive", it should be understood that the medium meets ε"(ω)≈ε', where ε' and ε"(ω) are respectively the real part and the imaginary part of the complex dielectric permittivity of the studied medium, for a pulsation ω of the electrical potential at the excitation electrode. As non-limiting examples, for an excitation frequency comprised between 0.1 Hz to 10 MHz, a partially electrically-conductive medium may have an electrical conductivity higher than or equal to 1 mS/cm, preferably higher than or equal to 1 S/cm, more preferably higher than or equal to 10 S/cm. Hence, this limitation excludes both perfectly dielectric media MUT, or media that could be considered as such, in good approximation, and perfectly conductive media MUT, or the that could be considered as such, in good approximation, at the frequency f of the electrical potential $V_d$ applied at the excitation electrode. This could be expressed in a broader way than with an almost equal symbol (≈) in the following manner. By defining a particular value $\sigma_c=\omega\varepsilon'$, a "partially electrically-conductive" medium is a medium whose conductivity meets the following order relationship:

$$-3 < \log_{10}\sigma/\sigma_c \leq 3$$

By medium or material that is "dielectric", or able to be considered as such, in good approximation, it should be understood that the medium or material meets ε"(ω)/ε'<0.001, or preferably ε"(ω)/ε'=0, where ε' and ε"(ω) are respectively the real part and the imaginary part of the complex dielectric permittivity of the material, irrespective of the pulsation ω of the electrical potential at the excitation electrode, and in particular for an excitation frequency f=ω/2π comprised between 0.1 Hz and 10 MHz. As non-limiting examples, for an excitation frequency f=ω/2π comprised between 0.1 Hz to 10 MHz, a dielectric medium or material may have an electrical conductivity strictly lower than 1 μS/cm.

By "representative" physical quantities or value of a parameter, it should be understood that said physical quantities or said value allow deducing, directly or indirectly, the considered parameter, and more particularly a value of the considered parameter.

By "shielding", it should be understood that the electric field lines are confined essentially (for example within a 1% margin, still preferably within a 1‰ margin) in the volume delimited by the container and its envelope.

More particularly, it arises from the foregoing that the medium MUT intended to be characterised is partially electrically-conductive over an excitation frequency interval [f] such that $f_{min}\leq f\leq f_{max}$, with f defining the pulsation ω of the measurement system by the relationship ω=2πf. Rather than considering a frequency interval, it might be equivalent to consider an electrical conductivity interval σ, for example as defined by the order relationship given hereinabove. These approaches could be considered equivalent to one another. In practice, a person skilled in the art could prefer to adapt the measurement frequency range to the medium MUT to be characterised.

It should be noted that the complex dielectric permittivity ε*(ω) intervenes both:

in the formula for calculating the conductivity of the medium between the excitation and measurement electrodes:

$$Y_m = j\omega C_m(\omega) = \frac{s_m}{l_m}\varepsilon'(\omega),$$

$Y_m$ being the admittance of the medium MUT, which is intended to be characterised, between the excitation electrode and the measurement electrode, and in the formula for calculating the conductivity of the medium between the excitation and reference electrodes:

$$Y_{mm} = j\omega C_{mm}(\omega) = \frac{s_{mm}}{l_{mm}}\varepsilon'(\omega),$$

$Y_{mm}$ being the admittance of the medium MUT, which is intended to be characterised, between the excitation electrode and the reference electrode, where $$\frac{S_m}{l_m} \text{ and } \frac{S_{mm}}{l_{mm}}$$

are quantities that are homogeneous to lengths related to the geometry of the medium to be characterised.

Before starting a detailed review of embodiments of the invention, other optional features of the first aspect of the invention which may possibly be used in combination or alternatively are set out hereinafter.

According to optional features of the first aspect of the invention:

at least one amongst the excitation electrode, the measurement electrode and the reference electrode is coated with a dielectric material, preferably each is coated with a dielectric material; and/or the capacitor formed by the excitation electrode and the measurement electrode is a capacitor with a planar geometry; This capacitor type, wherein the leakage fields predominantly contribute to the signal(s) useful for characterisation, are by construction easily disturbed by capacitive couplings with the medium to be characterised or with the environment; the device according to the first aspect of the invention is therefore particularly advantageous for this type of capacitor with a planar geometry.

Definition

By "coated with a dielectric material", it should be understood that at least one amongst the excitation electrode, the measurement electrode and the reference electrode may be directly covered with a dielectric material, for example via a dielectric film, or may be immersed (surrounded, wrapped) in a dielectric material, for example when at least one amongst the excitation electrode, the measurement electrode and the reference electrode is inside a dielectric wall of a container of the studied medium.

When at least one amongst the excitation electrode, the measurement electrode and the reference electrode is coated with a dielectric material, a conferred advantage is to get rid with a charge transfer resistance between the studied medium and that/those of the three electrodes (excitation, measurement, and reference) which is coated, as well as to limit the polarisation effects. The dielectric material coating at least one amongst the three electrodes allows avoiding direct contact between that/those of the three electrodes that is coated and the studied medium, so that any reaction related to the electrochemistry of the electrodes is absent, and therefore allows preserving the sterility of the studied medium, which is a major concern, for example for the characterisation of a cellular medium.

The capacitive couplings created between the excitation electrode and the reference electrode, and/or between the excitation electrode and the measurement electrode, could be taken into account by the processing unit in order to 'correct' the values of $C_x$ and/or $G_x$ calculated by the calculation unit. In other words, the system of equations with at least one equation allows considering such values of $C_x$ and/or $G_x$ which, when processed by the processing unit, allow taking account of a electric current circulating between the excitation electrode and the reference electrode and/or between the excitation electrode and the measurement electrode and, therefore, allow characterising the studied medium MUT more reliably.

According to another optional feature of the first aspect of the invention, the arrangement of the excitation electrode relative to the reference electrode is further such that a variation of the mutual capacitance between the excitation electrode and the reference electrode, denoted $\Delta C_{dg}$, meets:

$$\frac{1}{100}C_{ds} \leq \Delta C_{dg}$$

where $C_{ds}$ is a value representative of the mutual capacitance between the excitation electrode and the measurement electrode.

According to another optional feature of the first aspect of the invention, alternative to or combinable with the previous optional feature, the arrangement of the measurement electrode relative to the reference electrode is further such that the variation of the mutual capacitance between the measurement electrode and the reference electrode, denoted $\Delta C_{sg}$, meets:

$$\frac{1}{100}C_{ds} \leq \Delta C_{sg}$$

where $C_{ds}$ is a value representative of the mutual capacitance between the excitation electrode and the measurement electrode.

Definition

By "mutual capacitance" (or "transcapacitance" in English) of a pair of electrodes, it should be understood the electrical capacitance between the electrodes of the pair, i.e. the ratio between the amount of electrical charges carried by one electrode and the difference in potentials between the two electrodes.

A technical effect conferred by the joint verification of the last two optional features set out hereinabove, relating to the values of the mutual capacitance variations $\Delta C_{dg}$ and $\Delta C_{sg}$ with respect to the value $C_{ds}$ representative of the mutual capacitance between the excitation electrode and the measurement electrode, these variations being for example related to changes in the level and/or the quality of the studied medium, is to generate electric currents at the reference electrode and at the measurement electrode which are comparable to one another, at least in intensity, in the presence of the studied medium MUT. The resulting technical advantage consists at least in that the physical quantities measured by the electronic measurement circuit have similar dynamics. Henceforth, it is possible to characterise the studied medium, not only when it modifies the mutual capacitance $C_{ds}$ between the excitation electrode and the measurement electrode, but also when the medium substantially modifies the mutual capacitance $C_{dg}$ between the excitation electrode and the reference electrode, for example because of their respective arrangement (shape, position).

According to another optional feature of the first aspect of the invention, the electronic measurement circuit includes an operational amplifier, mounted as an inverter, and comprising:

- a non-inverting input, connected to the reference electrode,
- an inverting input, connected to the measurement electrode,
- an output, where the physical quantities are measured,
- a feedback loop, connecting the output to the inverting input.

Thus, a conferred advantage is to easily obtain a virtual mass allowing virtually grounding the measurement electrode. Hence, the excitation electrode and the measurement electrode, although separated by a high impedance, are set at the same reference electrical potential.

According to the previous optional feature of the first aspect of the invention:

- the feedback loop may comprise a regulator, preferably of the Proportional-Integral type, configured so that the operational amplifier operates in a linear mode. Thus, a conferred advantage is to avoid saturation of the operational amplifier; and/or
- the measurement electronic circuit may be configured to measure an in-phase voltage amplitude $V_I$ and a quadrature voltage amplitude $V_Q$ at the output of the operational amplifier, said physical quantities comprising, and possibly consisting of, the in-phase voltage amplitude $V_I$ and the quadrature voltage amplitude $V_Q$;
- the equivalent electrical capacitance $C_x$ may be calculated by the calculation unit according to the following formula:

$$C_X = C_{fb} \times \frac{V_I}{V_d}$$

where:

- $C_{fb}$ is a predetermined electrical capacitance, belonging to the feedback loop of the operational amplifier,
- $V_I$ is an amplitude of the measured in-phase voltage at the output of the operational amplifier, and
- $V_Q$ is an amplitude of the quadrature voltage measured at the output of the operational amplifier;

the equivalent conductance $G_x$ may be calculated by the calculation unit according to the following formula:

$$G_X = A \times C_{fb} \times f \times \frac{V_Q}{V_d}$$

where:

- $C_{fb}$ is a predetermined electrical capacitance, belonging to the feedback loop of the operational amplifier,
- $V_I$ is an amplitude of the measured in-phase voltage at the output of the operational amplifier, $V_Q$ is an amplitude of the quadrature voltage measured at the output of the operational amplifier, $V_d$ is the electrical potential applied at the excitation electrode, f is the frequency of the electrical potential $V_d$ applied at the excitation electrode such that $\omega=2\pi f$, where $\omega$ is the pulsation of the electrical potential $V_d$ at the excitation electrode, and A is a constant related to the shape of the electrical potential applied at the excitation electrode.

Definition:

By "in-phase voltage and quadrature voltage", it should be understood the decomposition (demodulation) of the electrical potential difference between the output of the operational amplifier and the reference electrode, evaluated with respect to the difference in electrical potential between the excitation electrode and the measurement electrode, whose phase could serve as a reference.

Definition

By "predetermined", it should be understood that the value of the electrical capacitance $C_{fb}$ is determined upon construction or selectable from among a range of values (for example 47 pF or 237 pF), so as to adjust a time constant for the feedback loop.

According to another optional feature of the first aspect of the invention, the electronic measurement circuit is configured to measure the physical quantities representative of the first electrical current by a "three-wire" or "four-wire" type method.

Thus, a conferred advantage is to get rid of parasitic capacitances between:

on the one hand, the excitation electrode and the reference electrode;

on the other hand, the measurement electrode and the reference electrode.

According to another optional feature of the first aspect of the invention, the capacitor formed by the excitation electrode and the measurement electrode may be selected from among a parallel plate capacitor, an interdigitated electrode capacitor, a coaxial cylinder capacitor.

According to another optional feature of the first aspect of the invention, the control electronics may be configured to apply an electrical potential at the excitation electrode according to a selected fixed frequency so that the medium intended to be characterised is at least partially electrically-conductive, and possibly partially electrically-conductive, at said fixed frequency.

Thus, a conferred advantage is to enable the measurement of a level of the studied medium.

According to another optional feature of the first aspect of the invention, the control electronics may be configured to make the pulsation $\omega$ of the electrical potential applied at the excitation electrode 1 vary over at least one portion of an interval over which the medium MUT intended to be characterised is at least partially electrically-conductive, said variation consisting, where appropriate, in scanning said interval and said interval preferably corresponding to a frequency band comprised between 0.1 Hz and 10 MHz.

Thus, a conferred advantage is to allow the measurement of the quality of the studied medium, for example the species contained therein and their proportions in the studied medium.

According to another optional feature of the first aspect of the invention, the characterisation device may further comprise a switch and a control electrode whose potential is alternately left floating or connected to the control electronics by the switch.

According to another optional feature of the first aspect of the invention, the characterisation device may further comprise a switch arranged between the measurement and reference electrodes.

A second aspect of the invention relates to a characterisation system comprising at least one characterisation device as described hereinabove and, where appropriate, a container, preferably of the tank type or duct type, intended to receive a medium MUT to be characterised.

Definition

By "container", it should be understood any support allowing containing the studied medium.

According to an optional feature of the second aspect of the invention, the container includes:

a wall, arranged so as to separate the studied medium MUT from an outside environment, the wall comprising:

an inner surface, directed towards the studied medium, coated with a dielectric film;

an outer surface, opposite to the inner surface, and directed towards the outside environment;

a sealed case, made of a dielectric material, and extending inside the container, the sealed case being intended to be immersed in the studied medium;

the characterisation device according to an embodiment of the first aspect of the invention being arranged inside the sealed case so that the excitation electrode and the measurement electrode generate an electric field inside the container.

Definition

By "sealed", it should be understood that the case is adapted so that the studied medium cannot penetrate inside.

According to another optional feature of the second aspect of the invention, the container includes:

a wall, arranged so as to separate the studied medium from an outside environment, and made of a dielectric material, the wall comprising:

an inner surface, directed towards the studied medium;

an outer surface, opposite to the inner surface, and directed towards the outside environment;

a case, made of a dielectric material, and extending over the outer surface;

the characterisation device according to an embodiment of the first aspect of the invention being arranged inside the case so that the excitation electrode and the measurement electrode generate an electric field inside the container.

According to another optional feature of the second aspect of the invention, the container includes:

a wall, arranged so as to separate the studied medium from an outside environment, and made of a dielectric material;

at least one closed cavity, formed inside the wall;

the characterisation device according to an embodiment of the first aspect of the invention being arranged inside the closed cavity so that the excitation electrode and the measurement electrode generate an electric field inside the container.

Definition

The term "wall" may include the presence of a plurality of layers therein, for a multilayer-type container (for example a multilayer tank, a multilayer tube). Preferably, the closed cavity is formed between two adjacent layers.

Thus, a conferred advantage is to protect the device thanks to such a hollow wall, provided with at least one closed cavity. The device, arranged inside the closed cavity, is protected from both the outside environment and the studied medium. The device performs the measurements at a distance from the studied medium by generating an electric field inside the container.

Another aspect of the invention relates to a method for calibrating a characterisation device according to the first aspect of the invention or a characterisation system according to the second aspect of the invention.

According to an optional feature, the calibration method may comprise a step of making the pulsation ω of the electrical potential applied at the excitation electrode vary over at least one portion of an interval over which the medium MUT intended to be characterised is at least partially electrically-conductive.

Another aspect of the invention relates to a method for characterising a medium MUT implementing a characterisation device according to the first aspect of the invention or a characterisation system according to the second aspect of the invention.

According to an optional feature, the characterisation method may comprise a step of making the pulsation ω of the electrical potential applied at the excitation electrode vary over at least one portion of an interval over which the medium MUT intended to be characterised is at least partially electrically-conductive.

According to another optional feature of the characterisation method, the medium MUT intended to be characterised may be selected from among:

- a cell medium;
- a partially electrically-conductive liquid, and for example a food liquid, such as a full-cream or semi-skimmed milk;
- an electrolyte;
- a complex aqueous medium; and
- a mixture containing water and a diesel exhaust fluid containing 32.5% high-purity urea and 67.5% deionized water.

Another aspect of the invention relates to a conductivity meter comprising a characterisation system according to the second aspect of the invention, wherein a quantity $-\tan(\delta)=-G_x/(\omega C_x)$ is determined to deduce a characteristic frequency proportional to the conductivity of the medium MUT contained in the container.

According to this aspect, it is possible to use the equivalent electrical capacitance $C_x$ and the equivalent conductance $G_x$ to calculate an electrical quantity $\tan(\delta)=G_x/(\omega C_x)$ representative of the dissipation of the medium MUT. If we define $\omega_c=\sigma/\varepsilon'$ as the critical pulsation for which real and complex permittivities of the medium MUT have the same value, one could notice that the quantity $\tan(\delta)$ has a universal form as a function of the quantity $\omega/\omega_c$ or approaches it so as to be able to be modelled and to be able to deduce therefrom the conductivity of the medium MUT. Thus, the robustness of the characterisation offered by the different aspects of the invention and the possibility for the characterisation system are demonstrated according to the second aspect of the invention to make a conductivity meter.

BRIEF DESCRIPTION OF THE DRAWINGS

Other features and advantages will appear in the detailed disclosure of different embodiments of the invention, the disclosure being accompanied by examples and references to the appended drawings.

The drawings are given as examples and do not limit the invention. They form block diagrams intended to facilitate understanding of the invention and are not necessarily plotted to the scale of practical applications.

DETAILED DISCLOSURE OF DIFFERENT EMBODIMENTS

Elements that are identical or ensuring the same function will bear the same references for the different embodiments, for simplicity.

In order to avoid the measurement of the capacitance (or impedance) of the medium to be characterised being affected by the disturbances related to coupling of the characterisation device, or of the medium too, with the environment, advanced characterisation systems of the impedance meter type are designed so as to integrate a grounded third conductor (also so-called "ground" in English) so as to enable shielding of the measurement between the excitation and measurement electrodes. In this case, the potential of the measurement electrode is virtually grounded by servo-control through a high-impedance system, such as an operational amplifier. This is particularly useful for electrodes with a planar geometry for which the leakage fields predominantly contribute to the useful signal, and are therefore, by construction, easily disturbed by couplings with the outside.

In such configurations, the measurement of the mutual capacitance $C_{ds}$ between the excitation and measurement electrodes is no longer univocally related to $\varepsilon^*(\omega)$, resulting in ad-hoc (by subtraction of full/empty situations, etc.) and often unjustified interpretations which limit predictions of the observations.

To overcome this, the solution provided by the present characterisation device allows, for example, accessing the complex dielectric permittivity $\varepsilon^*(\omega)$ on the basis of the measurement of the complex capacitance $C^*(\omega)$ and of the geometry and the arrangement of the different implemented elements of the characterisation device.

Thus, the first aspect of the invention relates to a device 0 for characterising a medium MUT by capacitance spectroscopy.

Figure 1:
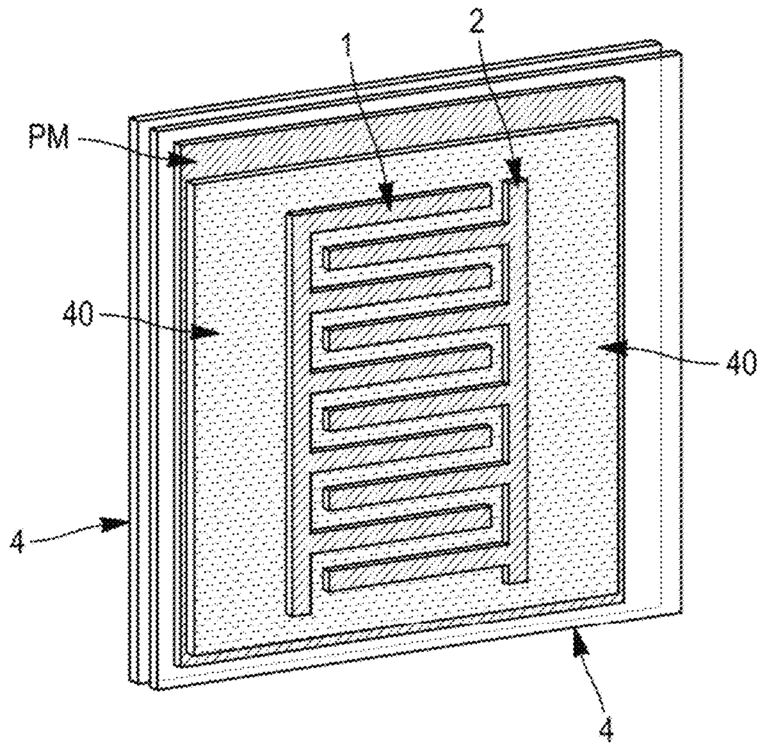
FIG. 1 is a partial schematic perspective view of a device according to a first embodiment of the first aspect of the invention, wherein the excitation, measurement, and reference electrodes are covered with a protective dielectric film and are intended to be immersed in the medium to be characterised.

Referring to each of FIGS. 1 to 13, the characterisation device 0 comprises an excitation electrode 1 and a measurement electrode 2. Each of these electrodes have a determined geometry, for example as illustrated in FIG. 1. The excitation 1 and measurement 2 electrodes are intended to be arranged relative to one another so as to form a capacitor 12.

Referring to each of FIGS. 2 to 10A, the characterisation device 0 further comprises a reference electrode 3 having a determined geometry and defining a reference electrical potential $V_g$.

Figure 11:
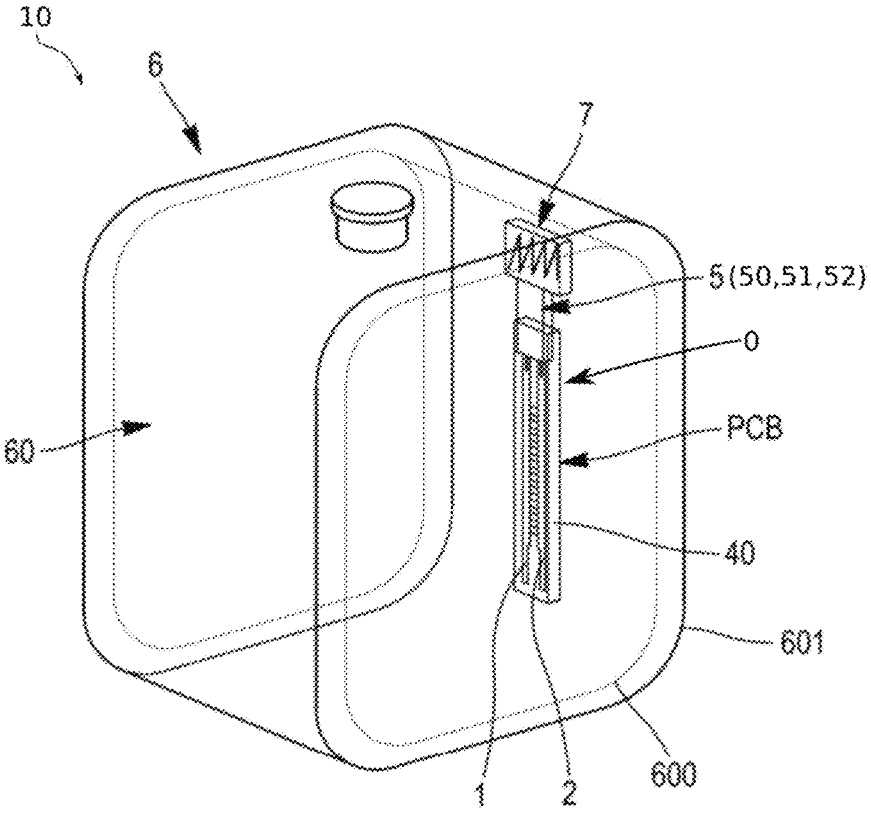
FIG. 11 is a partial schematic perspective view of a characterisation system according to a first embodiment of the second aspect of the invention; the reference electrode is not shown therein for readability.
Figure 12:
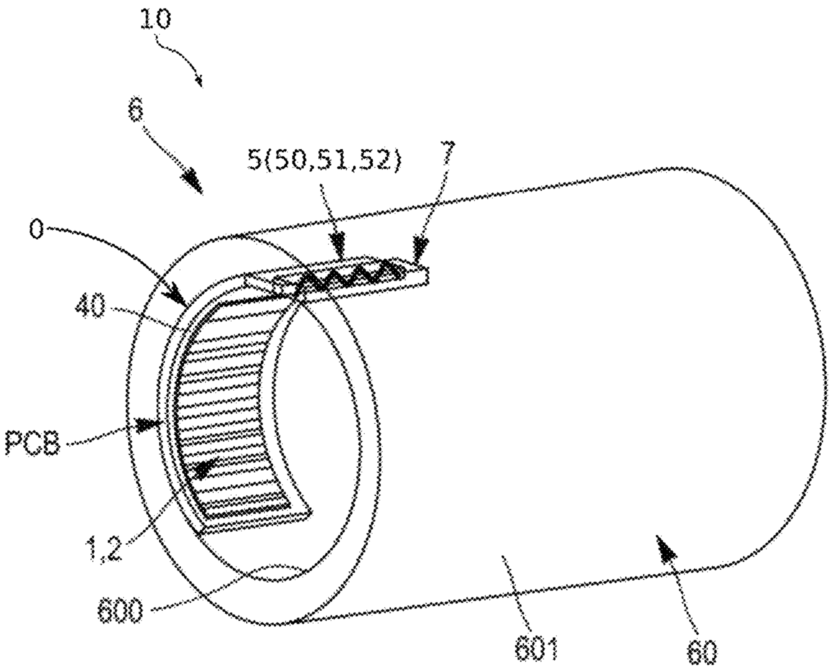
FIG. 12 is a partial schematic perspective view of a characterisation system according to a second embodiment of the second aspect of the invention; the reference electrode is not shown therein for readability.
Figure 13:
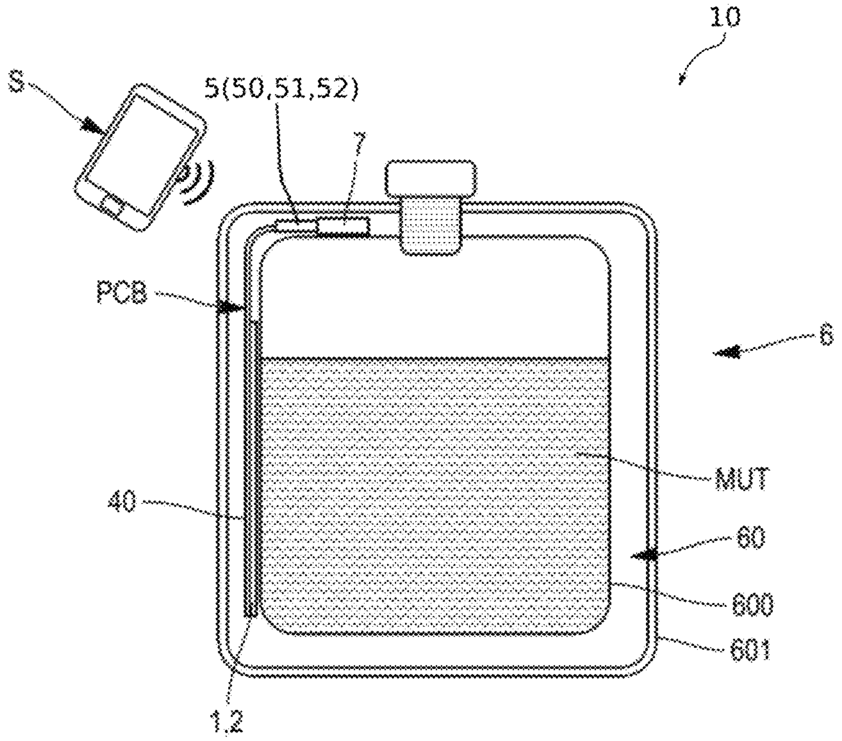
FIG. 13 is a partial schematic side view of a characterisation system according to a third embodiment of the second aspect of the invention; the reference electrode is not shown therein for readability.
Figure 14:
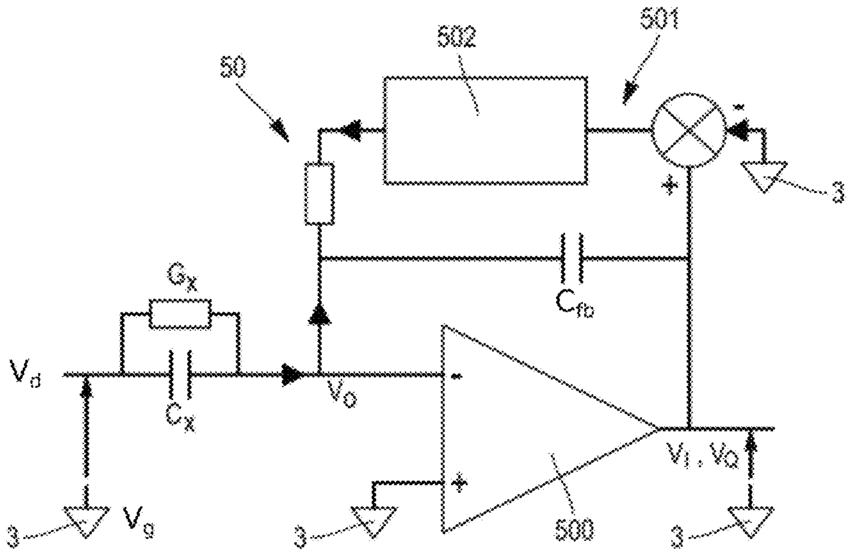
FIG. 14 is an electronic diagram illustrating in particular an electronic measurement circuit of a device according to an embodiment of the first aspect of the invention.

As illustrated in FIGS. 11 to 13, the characterisation device 0 also comprises control electronics 5 configured to apply an electrical potential $V_d$ at the excitation electrode 1, and, with reference to FIG. 14, an electronic measurement circuit 50 having a virtual ground $V_0$ connected, preferably directly, to the measurement electrode 2.

Figure 15:
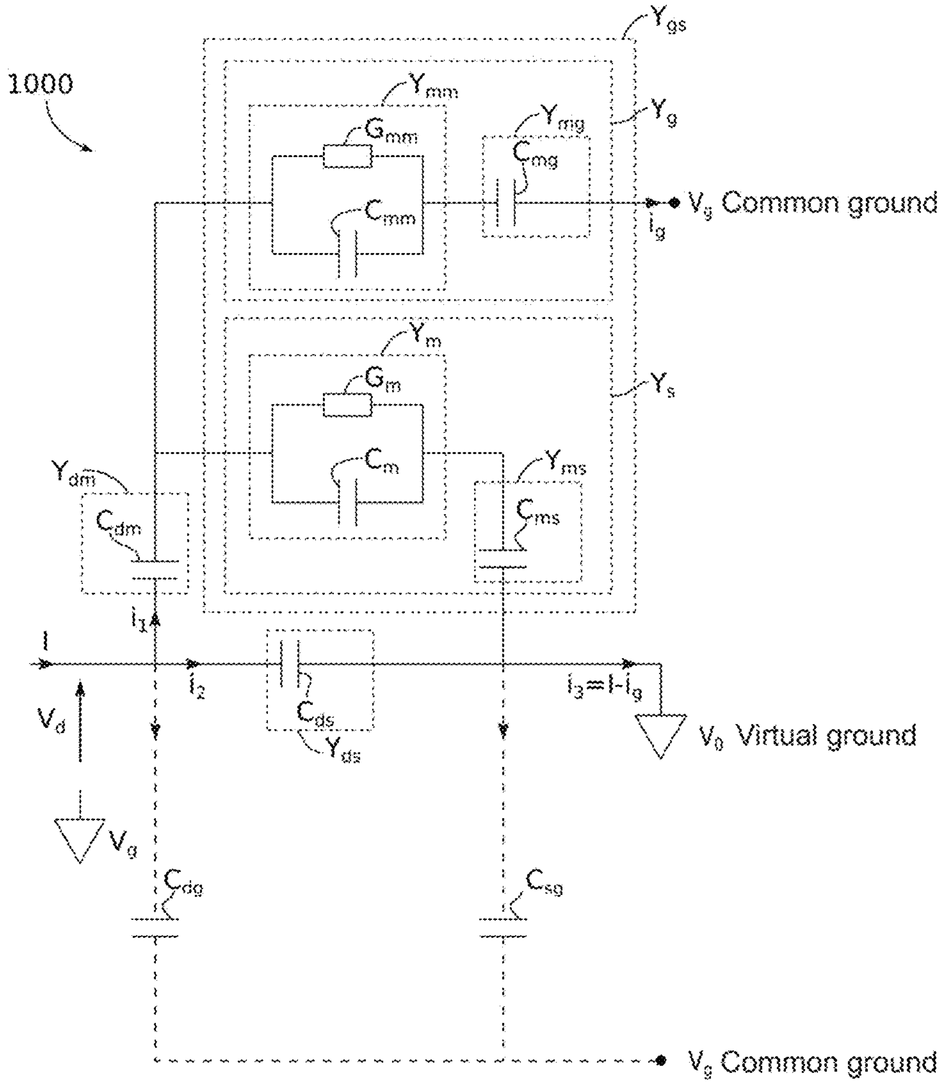
FIG. 15 is an electrical diagram of an example of modelling of the behaviour of a characterisation system according to an embodiment of the second aspect of the invention wherein the medium to be characterised is contained in a tank having dielectric walls.

The characterisation device 0 according to the first aspect of the invention differs from existing characterisation devices in that the excitation, measurement and reference electrodes 1, 2 and 3 that it comprises are herein intended to be arranged relative to one another and relative to the medium MUT intended to be characterised according to an arrangement such that:

- on the one hand, the control electronics 5 are configured to make the electrical potential $V_d$ at the excitation electrode 1 vary over time with a pulsation ω selected so that the medium MUT intended to be characterised is at least partially electrically-conductive,
- on the other hand, with reference to FIG. 15, the excitation and measurement electrodes 1 and 2 are arranged so as to enable a first electric current, denoted $i_1$-$i_g$, to circulate therebetween via the medium MUT, and the excitation and reference electrodes 1 and 3 are arranged so as to enable a second electric current, denoted $i_g$, to circulate therebetween via the medium MUT.

Figure 16:
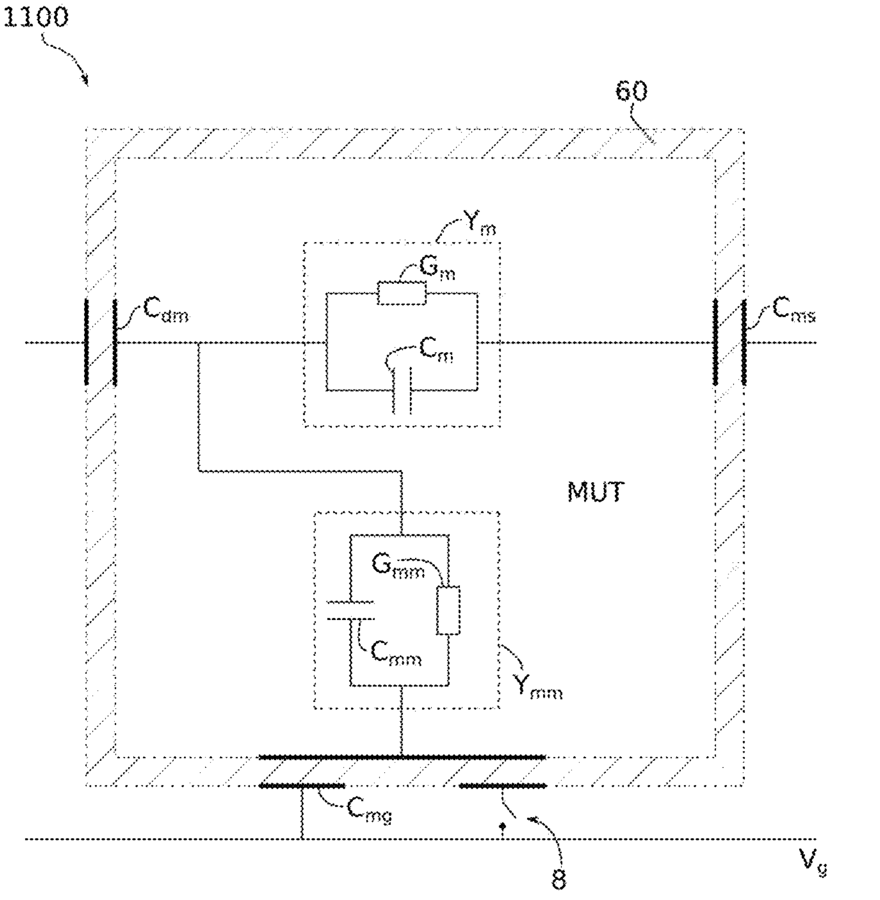
FIG. 16 is an electrical diagram of an example of modelling of the behaviour of a characterisation system according to another embodiment of the second aspect of the invention wherein the medium to be characterised is still contained in a tank having dielectric walls, but where the tank is schematically illustrated, in contrast with the illustration of FIG. 15, and wherein the characterisation device further comprises an additional control electrode, the potential of which could be left floating or connected to the measurement electronics by a switch.
Figure 19:
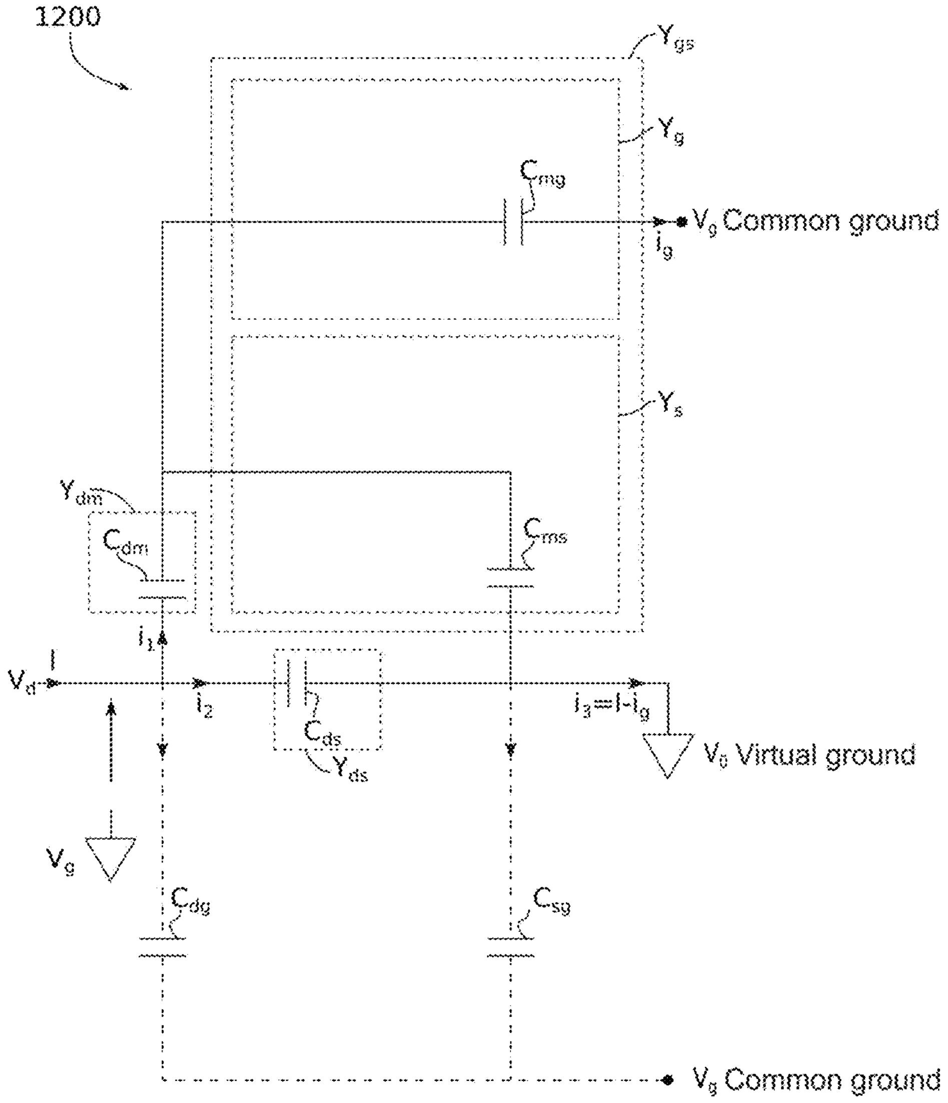
FIG. 19 is an electrical diagram of an example of modelling of the behaviour of a characterisation system as illustrated in FIG. 18*b*, wherein the medium to be characterised is contained in a tank having dielectric walls, wherein the characterisation of the medium MUT consists in determining the level in the tank and wherein the medium MUT is fluid and electrically-conductive at the considered measurement frequency.

In this manner, with reference to any one of FIGS. 15, 16 and 19, at least one amongst the following capacitive couplings is created:

- A capacitive coupling $C_{dm}$ between the excitation electrode 1 and the medium MUT,
- A capacitive coupling $C_{ms}$ between the measurement electrode 2 and the medium MUT, and
- A capacitive coupling $C_{mg}$ between the reference electrode 3 and the medium MUT; which is not negligible, quite the contrary, significant.

It should herein be noted that such a capacitive coupling could be related to at least one amongst the fact that the considered electrode is coated with a dielectric material and the fact that the considered electrode is integrated into the dielectric wall 60 of a container 6 of the medium to be characterised, as illustrated in particular in FIGS. 11 to 13.

Such an arrangement has the consequence that a current, denoted $i_3$, originating from the excitation electrode 1 and reaching the measurement electrode 2, and for example as illustrated in FIG. 15, forms a useful signal which, while it is strongly disturbed by the leakage fields, it is so in a controlled manner, in particular by that or those which, amongst the aforementioned capacitive couplings, is the highest or are the highest.

Thus, insofar as the electronic measurement circuit 50 is configured to measure physical quantities representative of the current $i_3$, a calculation unit 51 of the characterisation device 0 may advantageously be configured to calculate, from these physical quantities, an equivalent electrical capacitance value, denoted $C_x$, and/or an equivalent conductance value, denoted $G_x$, between the excitation and measurement electrodes 1 and 2, which define an equivalent electrical model naturally taking account of the influence of the at least partially electrically-conductive medium MUT.

Insofar as said equivalent electrical model is defined quantitatively by so-called equivalent values, herein of the equivalent electrical capacitance $C_x$ and of the equivalent conductance $G_x$, and these equivalent values are involved in an equation or a system of equations built based on a model of the behaviour of a characterisation system 10 comprising at least the characterisation device 0, a processing unit 52 of the characterisation device 0 may advantageously be configured to process each equivalent value having been calculated by the calculation unit 51, to determine:

- at least one from among a capacitance value $C_m$ of the medium MUT at the measurement electrode 2 and a capacitance value $C_{mm}$ of the medium MUT at the reference electrode 3, and/or
- at least one amongst a conductance value $G_m$ of the medium MUT at the measurement electrode 2 and a conductance value $G_{mm}$ of the medium MUT at the reference electrode 3, by solving the equation or the system of equations translating the selected model of the behaviour of the characterisation system 10.

For example, three different models, referenced 1000, 1100 and 1200, are illustrated in FIGS. 15, 16 and 19.

Preferably, each equation relates together at least:

- one of the equivalent values having been calculated,
- the capacitance $C_m$ of the medium MUT at the measurement electrode 2 and the capacitance $C_{mm}$ of the medium MUT at the reference electrode 3,
- the value of the capacitive coupling $C_{dm}$ created between the excitation electrode 1 and the medium MUT, the value of the capacitive coupling $C_{ms}$ created between the measurement electrode 2 and the medium MUT and the value of the capacitive coupling $C_{mg}$ created between the reference electrode 3 and the medium MUT,
- a pulsation ω of the electrical potential $V_d$ at the excitation electrode 1, and
- the conductivity σ of the medium MUT to be characterised.

As stated before, FIG. 15 illustrates a possible modelling of a characterisation system 10 according to the second aspect of the invention. According to this model, the walls 60 of a container 6 of the medium MUT to be characterised are illustrated in the form of capacitors with capacitances denoted $C_{dm}$ for the wall separating the excitation electrode 1 from the medium MUT, $C_{ms}$ for the wall separating the measurement electrode 2 from the medium MUT and $C_{mg}$ for the wall separating the reference electrode from the medium MUT. It should be noted that each of these capacitors is related to a corresponding one amongst as many admittances, denoted $Y_{dm}$, $Y_{ms}$ and $Y_{mg}$, respectively. It should also be noted that a method for calibrating the characterisation device 0 according to the second aspect of the invention or of the characterisation system 10 according to the second aspect of the invention will have the main objective of determining at least preferably each of these capacitances $C_{dm}$, $C_{ms}$ and $C_{mg}$.

Moreover, still with reference to FIG. 15, the influence of the at least partially electrically-conductive medium MUT on the useful signal is may be represented in the form of two pairs of a capacitance and a conductance placed parallel to one another. A first pair of these two pairs, identified by the index "mm", translates the influence of the medium MUT between the excitation electrode 1 and the reference electrode 3, and the second one of these two pairs, identified by the index "m", translates the influence of the medium between the excitation electrode 1 and the measurement electrode 2. It should be noted that each of its representations may be associated with an admittance, denoted $Y_{mm}$ for the aforementioned first pair and denoted $Y_m$ for the second pair.

Henceforth, it should be understood that the model proposed in FIG. 15 could be translated into one or more equation(s) relating together different physical quantities illustrated in FIG. 15 to at least one, preferably each one, among the equivalent capacitance $C_x$ and the equivalent conductance $G_x$ as illustrated in FIG. 14. Such setting into equation(s) will be set out hereinbelow.

Excitation Electrode and Measurement Electrode

It should herein be noted that the characterisation device 0 according to the first voltage aspect is not limited to only one unit of each of the aforementioned three electrodes, but may include a plurality of pairs of excitation 1 and measurement 2 electrodes, each pair of excitation 1 and measurement 2 electrodes forming a capacitor. For example, the characterisation device 0 may have two measurement electrodes as illustrated in FIG. 9C.

Advantageously, the excitation electrode 1 and/or the measurement electrode 2 may be coated with a dielectric material 4, so that a capacitive coupling is created between the excitation electrode 1 and the measurement electrode 2, when the studied medium MUT is at least partially electrically-conductive.

Figure 2:
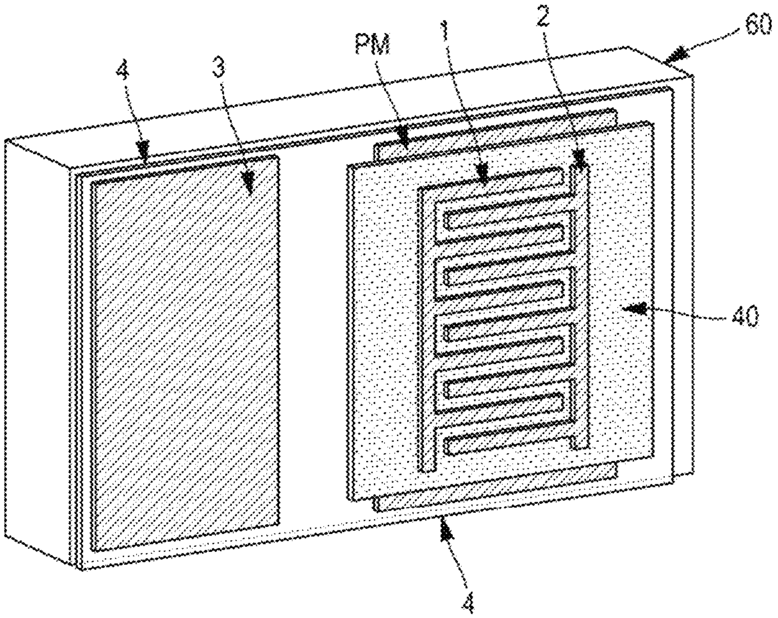
FIG. 2 is a partial schematic perspective view of a device according to a second embodiment of the first aspect of the invention, wherein the excitation, measurement and reference electrodes are covered with a protective dielectric film and equip a wall of a container intended to contain the medium to be characterised.

The dielectric material 4 may be made in the form of a dielectric film (as illustrated in FIGS. 1 and 2), which could have a thickness preferably comprised between 100 nm and 10 μm. As non-limiting examples, the dielectric material 4 is preferably selected from among a polyimide, a polytetrafluoroethylene and a thermosetting resin.

Figure 3:
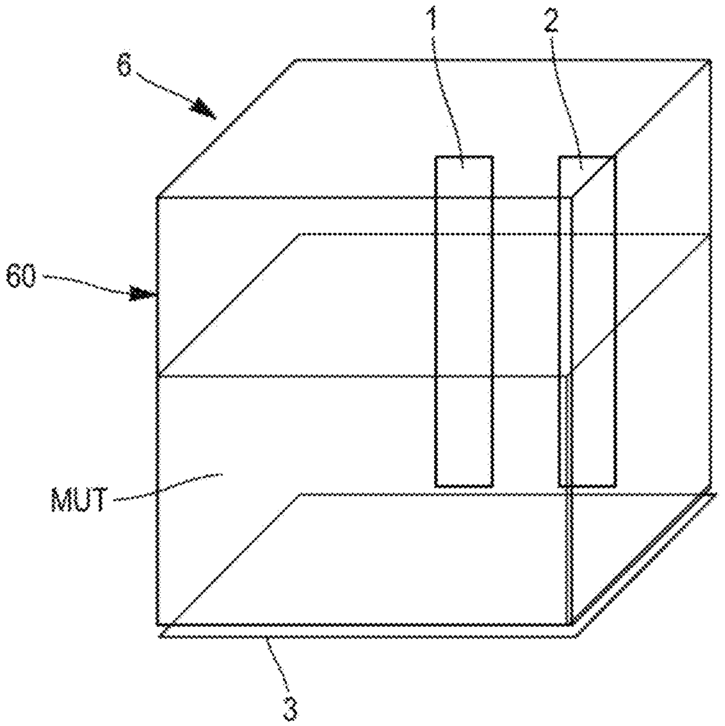
FIG. 3 is a partial schematic perspective view of a device according to a third embodiment of the first aspect of the invention wherein the reference electrode is arranged under a container of the medium MUT to be characterised, outside a wall made of a dielectric material separating the medium to be characterised from its environment.
Figure 4:
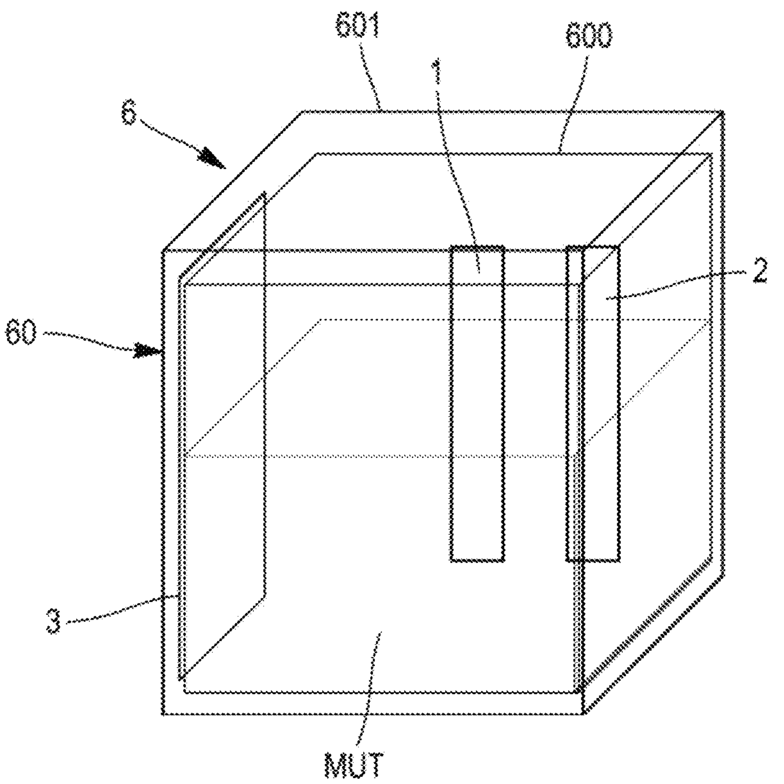
FIG. 4 is a partial schematic perspective view of a device according to a fourth embodiment of the first aspect of the invention wherein the reference electrode is arranged on the side of a container of the medium MUT to be characterised, inside a wall made of a dielectric material separating the medium to be characterised from its environment.
Figure 5:
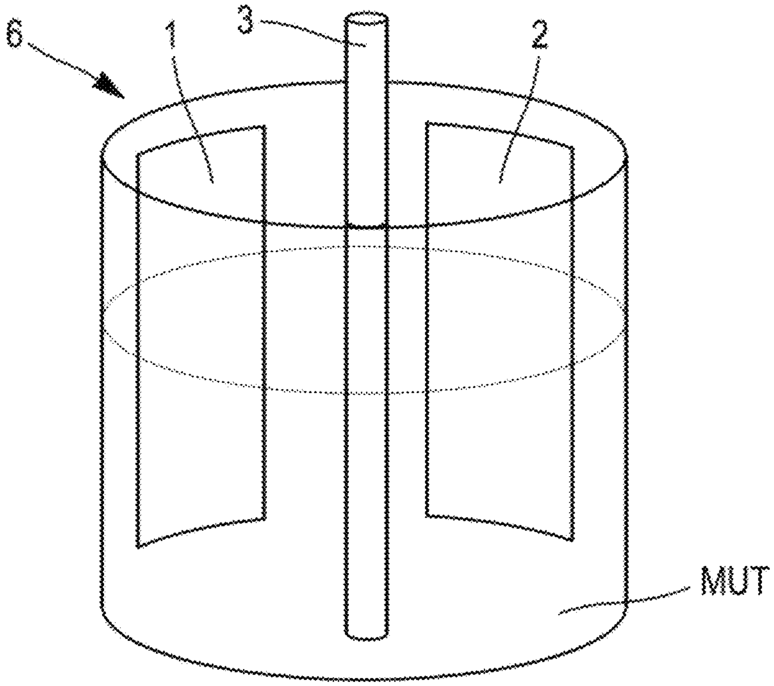
FIG. 5 is a partial schematic perspective view of a device according to a fifth embodiment of the first aspect of the invention wherein the reference electrode is arranged at the centre of a container of the medium MUT to be characterised; a dielectric material covering the reference electrode is not shown therein for readability.
Figure 6:
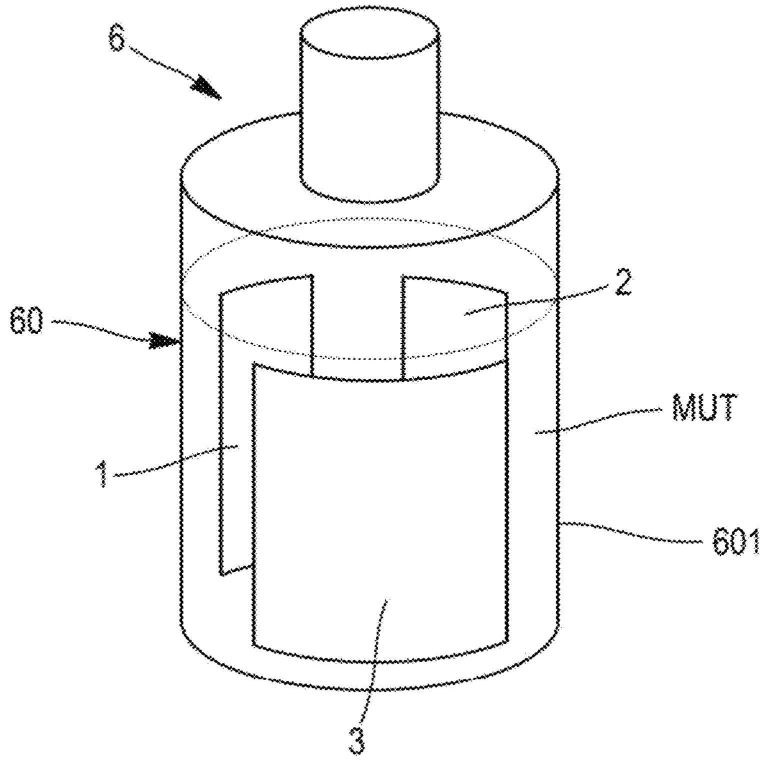
FIG. 6 is a partial schematic perspective view of a device according to a sixth embodiment of the first aspect of the invention wherein the reference electrode is arranged on the side of a container of the medium MUT to be characterised, outside a wall made of a dielectric material separating the medium to be characterised from its environment.
Figure 7:
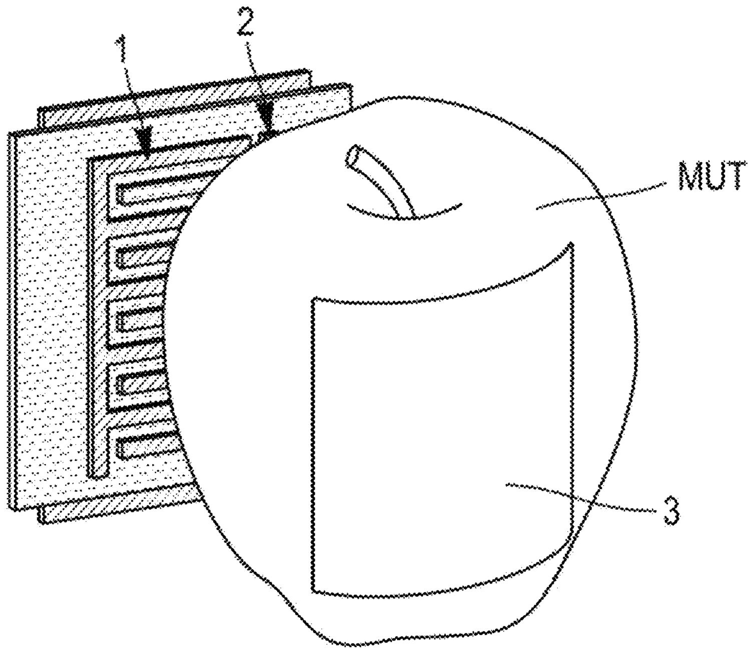
FIG. 7 is a partial schematic perspective view of a device according to a seventh embodiment of the first aspect of the invention for characterising ripening of a fruit; the dielectric material covering the reference electrode is not shown therein for readability.

The excitation electrode 1 and the measurement electrode 2 may have different shapes such as planar (as illustrated in FIGS. 3 and 4), curved (as illustrated in FIGS. 5 and 6), interdigitated (as illustrated in FIGS. 1, 2, 7), etc.

When the excitation electrode 1 and the measurement electrode 2 are covered with a dielectric film, the excitation electrode 1 and the measurement electrode 2 could be immersed in the studied medium MUT (as illustrated in FIGS. 3, 5 and 6).

The excitation electrode 1 and the measurement electrode 2, covered with a dielectric film, may also be at a distance from the studied medium (as illustrated in FIGS. 4 and 11 to 13).

The excitation electrode 1 and the measurement electrode 2 may be devoid of a dielectric film covering them directly. The excitation electrode 1 and the measurement electrode 2 could then, alternatively, be immersed (surrounded, wrapped) into a dielectric material; for example, the excitation electrode 1 and the measurement electrode 2 are inside a dielectric wall 60 of a container 6 of the studied medium MUT.

The excitation electrode 1 and the measurement electrode 2 may be made of a metal material, preferably selected from among copper Cu, silver Ag, gold Au and aluminium Al. Alternatively, the excitation electrode 1 and the measurement electrode 2 may be made of a plastic material (for example a polyphthalamide) into which conductive fillers, such as carbon fibres, have been incorporated, in order to make the excitation electrode 1 and the measurement electrode 2 electrically-conductive.

The characterisation device may include a ground plane PM (as illustrated in FIGS. 1 and 2) arranged relative to the excitation 1 and measurement 2 electrodes. The ground plane PM may ensure an electromagnetic shielding function and/or enable a common grounding of the electrodes of the characterisation device 0.

Advantageously, the ground plane PM is separated from the excitation electrode 1 and from the measurement electrode 2 by a dielectric layer 40 (as illustrated in FIGS. 1 and 2). Such a dielectric layer 40 allows electrically insulating the excitation 1 and measurement 2 electrodes and the ground plane PM from one another so as to avoid short-circuiting them.

The dielectric layer 40 may be made of a dielectric material selected from among a polyimide and a polytetrafluoroethylene.

The ground plane PM may be a plate made of a metal material. Preferably, the metal material is selected from among copper Cu, silver Ag, gold Au and aluminium Al. However, the ground plane PM may be made of a plastic material (for example a polyphthalamide) into which conductive fillers, such as carbon fibres, have been incorporated, in order to make the ground plane PM electrically-conductive.

As a non-limiting example, and with reference to FIGS. 15 and 19, the excitation electrode 1 and the measurement electrode 2 may be arranged so that a mutual capacitance value $C_{ds}$ between the excitation electrode 1 and the measurement electrode 2 is comprised between 15 pF and 25 pF, preferably between 18 pF and 22 pF.

Advantageously, the capacitor formed by the excitation electrode 1 and the measurement electrode 2 is selected from among a parallel plate capacitor, an interdigitated electrode capacitor and a coaxial cylinder capacitor. The capacitor formed by the excitation electrode 1 and the measurement electrode 2 may also be a capacitor with coplanar electrodes.

Reference Electrode

The characterisation device 0 may include a plurality of reference electrodes 3.

The reference electrode 3 may be a plate made of a metal material. Preferably, the metal material is selected from among copper Cu, silver Ag, gold Au and aluminium Al. Alternatively, the reference electrode 3 may be made of a plastic material (for example a polyphthalamide) into which conductive fillers, such as carbon fibres, have been incorporated, in order to make the reference electrode 3 electrically-conductive.

The reference electrode 3 can ensure an electromagnetic shielding function.

The reference electrode 3 may be coated with a dielectric material 4. The dielectric material 4 may be made in the form of a dielectric film (as illustrated in FIGS. 1 and 2), which could have a thickness preferably comprised between 100 nm and 10 μm. As non-limiting examples, the dielectric material 4 is preferably selected from among a polyimide, a polytetrafluoroethylene and a thermosetting resin.

When the reference electrode 3 is covered with a dielectric film, the reference electrode 3 may be immersed in the studied medium MUT (as illustrated in FIG. 5).

The reference electrode 3, covered with a dielectric film, may also be at a distance from the studied medium MUT (as illustrated in FIGS. 3 and 4).

The reference electrode 3 may be devoid of a dielectric film covering it directly. The reference electrode 3 could then be immersed (surrounded, wrapped) in a dielectric material, for example when the reference electrode 3 is inside a dielectric wall 60 of a container 6 of the studied medium MUT.

Figure 9A:
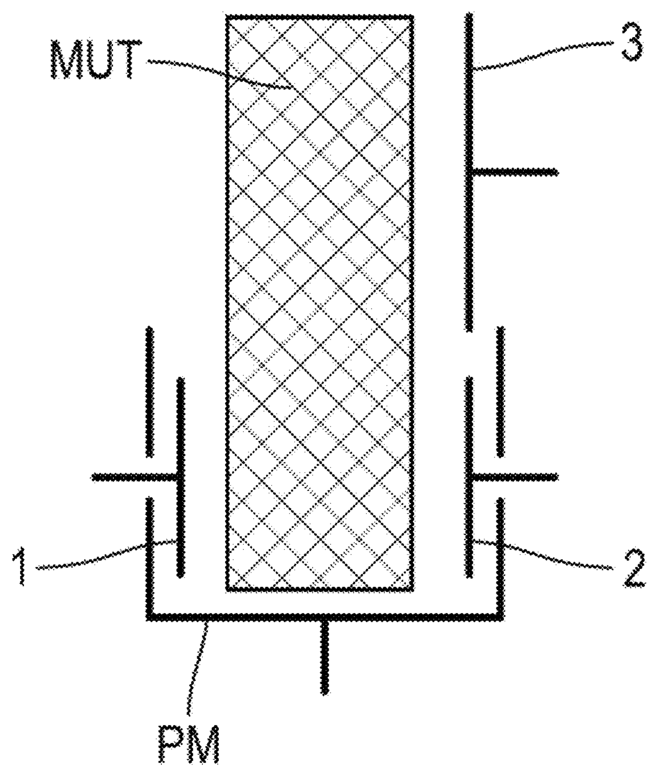
FIGS. 9A to 9C are partial schematic sectional views of a device according to other embodiments of the first aspect of the invention, illustrating different arrangements of the excitation, measurement and reference electrodes relative to the medium MUT to be characterised, and relative to an optional ground plane PM; the dielectric material covering the reference electrode is not shown for readability.
Figure 9B:
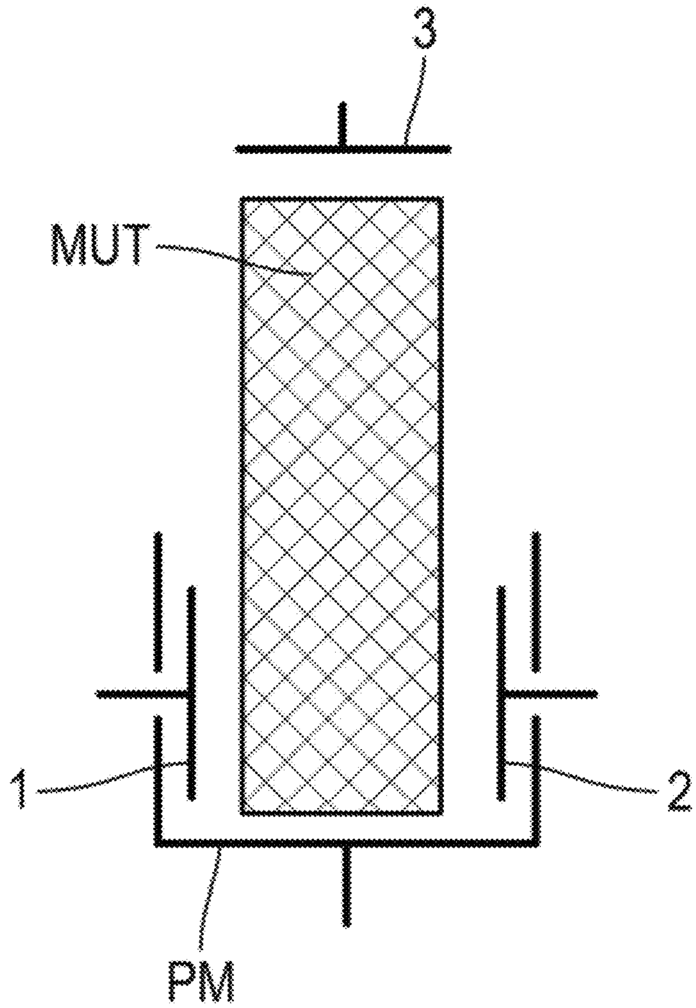
Figure 9C:
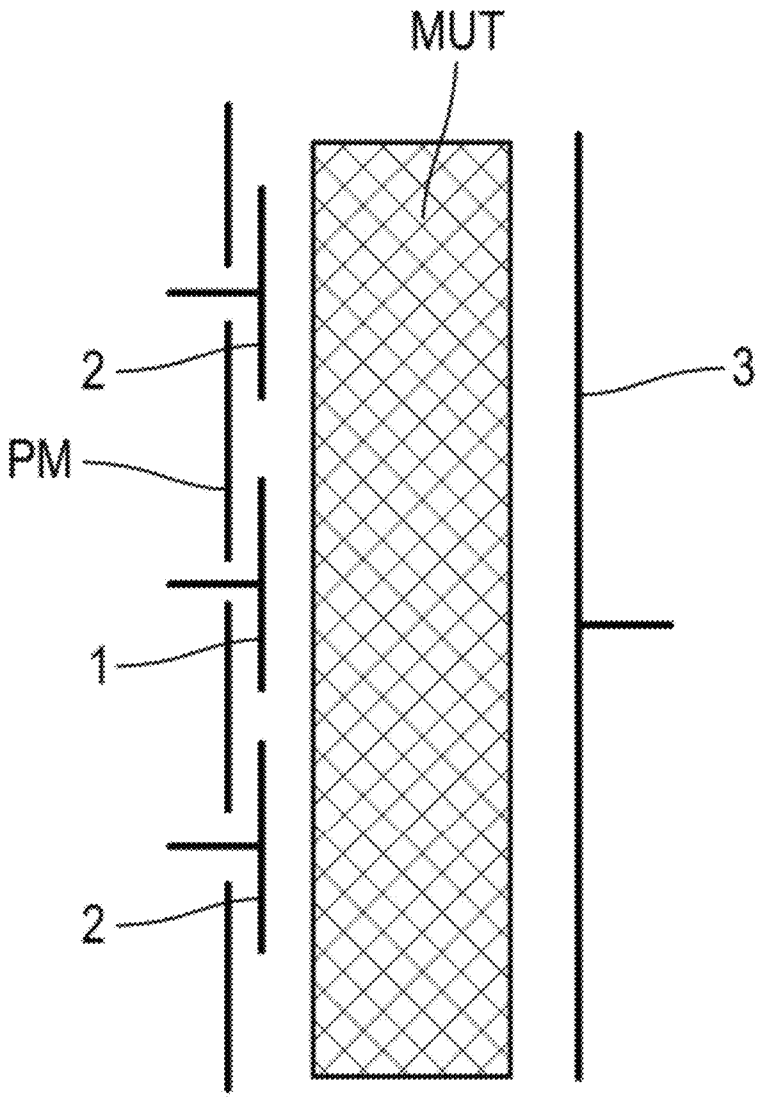

It should herein be noted that different relative arrangements of the excitation 1, measurement 2 and reference 3 electrodes are illustrated in FIGS. 9A, 9B and 9C. These different illustrations are not described in further detail herein, but are given as a non-limiting illustration, so as to highlight the wide variety of arrangements that could considered. Nevertheless, it should be noticed that each of these figures shows a ground plane PM and a possible arrangement of this ground plane PM relative to the electrodes 1, 2 and 3 of the characterisation device 0 according to the first aspect of the invention.

Control Electronics

Advantageously, the control electronics 5 are configured to:

- apply an electrical potential difference between the excitation electrode 1 and the measurement electrode 2, and modulate, for example periodically, the amplitude of the electrical potential difference.

Referring to FIG. 14, the control electronics 5 may comprise an electronic measurement circuit 50 configured to measure an in-phase voltage amplitude $V_I$ and a quadrature voltage amplitude $V_Q$ at the output of an operational amplifier 500.

More particularly, and as illustrated in FIG. 14, the electronic measurement circuit 50 may advantageously comprise an operational amplifier 500, mounted as an inverter, and comprising:

- a non-inverting input (denoted "+"), connected to the reference electrode 3,
- an inverting input (denoted "−"), connected to the measurement electrode 2,
- an output, where the physical quantities are measured,
- a feedback loop 501, connecting the output to the inverting input.

Advantageously, the feedback loop 501 (or "feedback loop" in English) may comprise a regulator 502, preferably of the Proportional-Integral type, configured so that the operational amplifier 500 operates in linear mode. The regulator 502 may belong to a first branch of the feedback loop 501.

Advantageously, the electronic measurement circuit 50 is configured to measure the physical quantities representative of the current is originating from the excitation electrode 1 and reaching the measurement electrode 2 by a three-wire or four-wire type method.

Advantageously, the in-phase voltage amplitude $V_I$ and the quadrature voltage amplitude $V_Q$ are the physical quantities representative of the first electric current already mentioned hereinabove. Advantageously, the signals of the in-phase voltage $V_I$ and of the quadrature voltage $V_Q$ may be filtered by a low-pass filter.

Advantageously, the control electronics 5 are configured to apply an electrical potential at the excitation electrode 1 according to a given frequency f, such that f=w/2π, where ω is the pulsation of the electrical potential applied at the excitation electrode.

According to one embodiment, the control electronics 5 are configured to apply an electrical potential at the excitation electrode 1 according to a fixed frequency selected so that the studied medium MUT is at least partially electrically-conductive at said fixed frequency.

If ε*(ω) denotes the complex dielectric permittivity of the studied medium MUT, ω being the pulsation of the electrical potential at the excitation electrode 1, it is possible to have ε*(ω)=ε'−jε"(ω) where ε' and ε"(ω) are respectively the real part and the imaginary part of the complex dielectric permittivity of the studied medium MUT. The imaginary part may be written as ε"(ω)=σ/ω where σ is the conductivity of the studied medium MUT. the fixed frequency, denoted f, may be selected so that ε"(ω)/ε'>0, or equivalently $f<f_c$ with $$f_c = \frac{\sigma}{2\pi\epsilon\prime},$$

in other words, so that the medium to be characterised is at least partially electrically-conductive.

The excitation electrode 1, the measurement electrode 2, and the reference electrode 3 could then be arranged so that the characterisation device 0 characterises a level of the studied medium MUT. For example, referring to FIG. 18B, the reference electrode 3 and the measurement electrode 2 may be arranged next to or opposite the excitation electrode 1, the reference electrode 3 being arranged below the measurement electrode 2, the level of the studied medium MUT being defined relative to a plane separating a lower portion 101 of the recipient 6 comprising the reference electrode 3 and an upper portion 102 of the recipient 6 comprising the measurement electrode 2.

More particularly, the complex dielectric permittivity ε*(ω) involving both:

- in the formula for calculating the conductivity $C_m$(ω) of the medium MUT between the excitation 1 and measurement 2 electrodes:

$$Y_m = j\omega C_m(\omega) = \frac{s_m}{l_m}\varepsilon'(\omega),$$

$Y_m$ being the admittance of the medium MUT to be characterised between the excitation electrode and the measurement electrode, and

- in the formula for calculating the conductivity $C_{mm}$(ω) of the medium between the excitation and reference electrodes:

$$Y_{mm} = j\omega C_{mm}(\omega) = j\omega\frac{s_{mm}}{l_{mm}}\varepsilon'(\omega),$$

$Y_{mm}$ being the admittance of the medium MUT to characterised between the excitation electrode and the reference electrode, where $$\frac{S_m}{l_m} \text{ and } \frac{S_{mm}}{l_{mm}}$$

are quantities homogeneous with lengths related to the geometry of the medium MUT to be characterised, the determination of the complex dielectric permittivity ε*(ω) of the medium MUT could be used to monitor the evolution of the contents of a recipient, in terms of chemical nature, ion concentration, or cell growth, as non-exhaustive examples.

It should be noted herein that by denoting, like before, $f_c$ the frequency such that $$f_c = \frac{\sigma}{2\pi\epsilon'},$$

it is possible to distinguish two modes:

- $f \ll f_c$ where the studied medium MUT is at least partially electrically-conductive, and where the capacitive couplings between the excitation electrode 1 and the reference electrode 3, and between the excitation electrode 1 and the measurement electrode 2, are effective; and
- $f \gg f_c$ where the studied medium MUT is insulating, with electric currents between the excitation electrode 1 and the reference electrode 3, and between the excitation electrode 1 and the measurement electrode 2, via the medium MUT being negligible.

In the mode where $f \ll f_c$, it is possible to prove the following relationships:

$$C_{ds} \approx \frac{\varepsilon_0}{\frac{2d_1}{\varepsilon_W S_d}}$$

$$C_{dg} \approx \frac{\varepsilon_0}{\frac{d_1}{\varepsilon_W S_d} + \frac{d_1}{\varepsilon_W S_g}}$$

Where:

$\varepsilon_0$ is the dielectric permittivity of vacuum, $d_1$ is the thickness of the dielectric material 4 covering the excitation electrode 1, the measurement electrode 2 and the reference electrode 3 (cf. FIG. 10A), $\varepsilon_W$ is the relative permittivity of the previous dielectric material 4

Figure 10A:
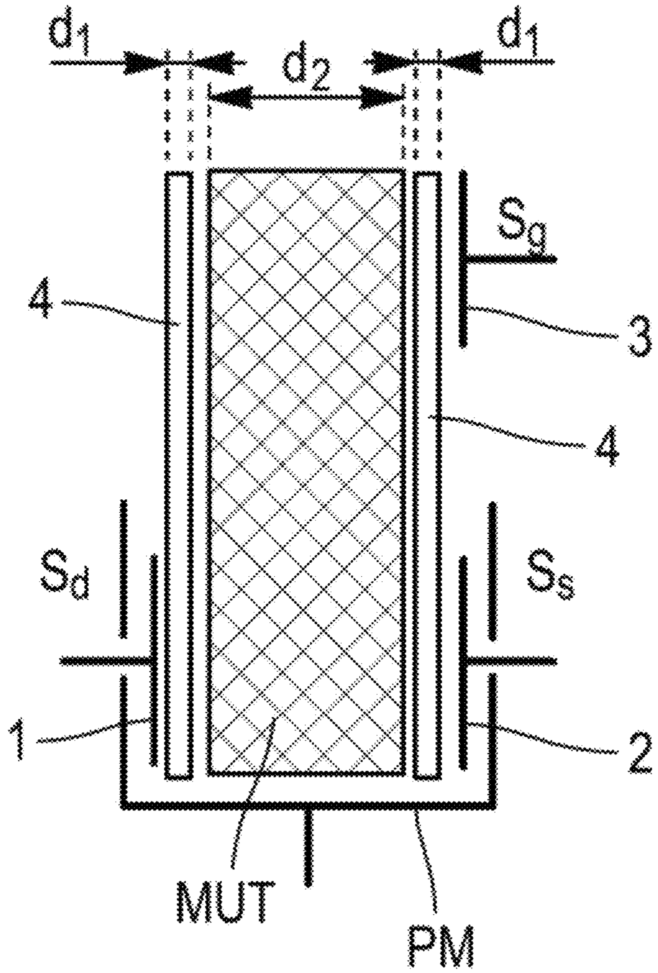
FIG. 10A is a partial schematic sectional view of a device according to another embodiment of the first aspect of the invention, illustrating the influence of the thickness of the dielectric material separating the excitation, measurement and reference electrodes from the medium MUT.

$S_d$ and $S_g$ are respectively the surface of the excitation electrode 1 and of the reference electrode 3 (cf. FIG. 10A).

In the mode where $f \gg f_c$, it is possible to show the following relationships:

$$C_{ds} \approx \frac{\varepsilon_0}{\frac{2d_1}{\varepsilon_W S_d} + \frac{d_2}{\varepsilon_{MUT} S_{MUT}}}$$

$$C_{dg} \approx 0$$

where:

$d_2$ is the width of the studied medium MUT (cf. FIG. 10A), $\varepsilon_{MUT}$ is the relative permittivity of the studied medium MUT, $S_{MUT}$ is the surface of the studied medium (cf. FIG. 10A).

$C_{dg}$ may also be equal to a constant, not related to the presence of the studied medium MUT.

It arises from the foregoing that the geometry of the different elements of the characterisation device 0 or of the characterisation system 10, and in particular of any dielectric coating(s), may also be equated and intervene, directly or indirectly, where appropriate, after calibration of the characterisation device 0 or of the characterisation system 10, in the equation or the system of equation to be solved.

Figure 8:
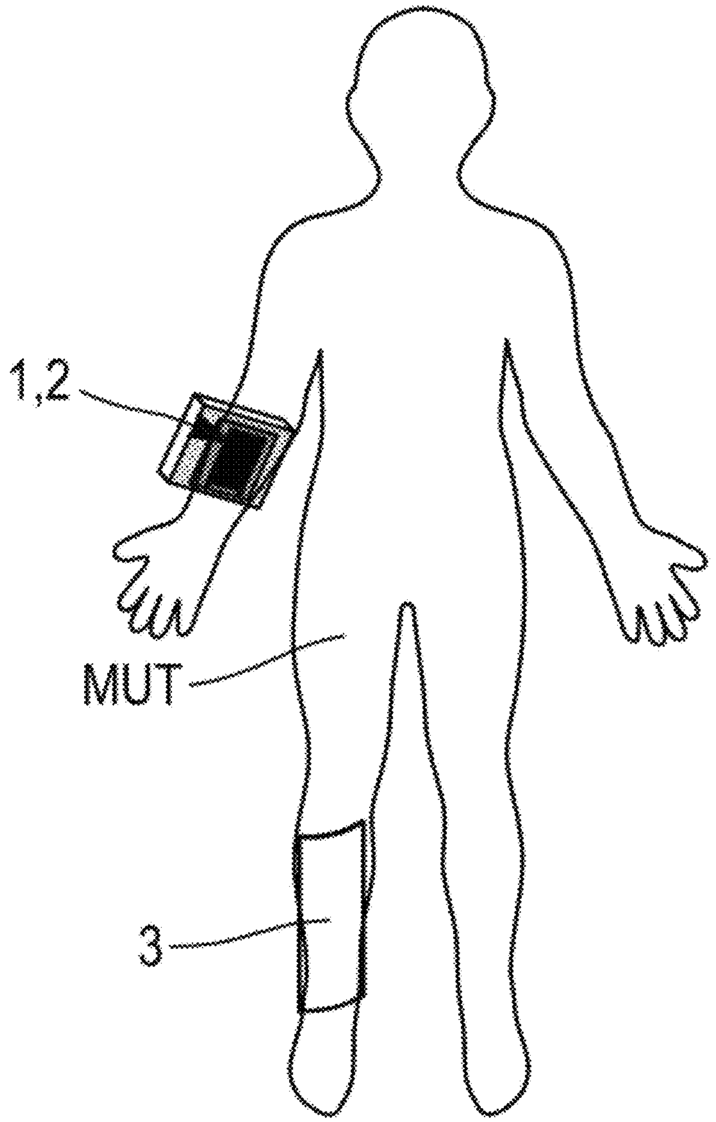
FIG. 8 is a partial schematic perspective view of a device according to an eighth embodiment of the first aspect of the invention for characterising at least one portion of a human body, and for example for characterising states of cells of said human body; the dielectric material covering the reference electrode is not shown therein for readability.

It should also be noted herein that, as illustrated in FIGS. 7 and 8, the characterisation device 0 according to the first aspect of the invention finds also application in the characterisation of non-fluid media, for example solids, such as foods (an apple in the example illustrated in FIG. 7) or all or part of a human or animal body (the arm of a human being in the example illustrated in FIG. 8), in particular for a bio-impedance measurement.

The control electronics 5 may be configured to apply a frequency-varying electrical potential at the excitation electrode over an excitation frequency interval [f] such that $f_{min} \leq f \leq f_{max}$, with f defining the pulsation of the measurement system ω by the relationship $\omega = 2\pi f$, so that, over this frequency interval, the medium MUT to be characterised is partially electrically-conductive, for example by meeting the following order relationship:

$-3 < \log_{10} \sigma/\sigma_c(\omega) \leq 3$, where $\sigma_c(\omega) = \omega\varepsilon'$ and σ is the conductivity of the medium to be characterised, ε' being the real part of the complex dielectric permittivity of the medium MUT to be characterised.

The reference electrode 3 could then advantageously be arranged relative to the excitation electrode 1 so that, over the excitation frequency interval [f], a variation in the mutual capacitance between the excitation electrode 1 and the reference electrode 3, denoted $\Delta C_{dg}$, meets:

$$\frac{1}{100} C_{ds} \leq \Delta C_{dg}$$

where, as already mentioned hereinabove, $C_{ds}$ is a value of the mutual capacitance between the excitation electrode 1 and the measurement electrode 2.

The shape of the reference electrode 3, the shape of the excitation electrode 1 and their relative position allows modifying the value of the mutual capacitance $C_{dg}$ between the excitation electrode 1 and the reference electrode 3.

Similarly, the shape of the excitation electrode 1, the shape of the measurement electrode 2 and their relative position allows modifying the value of the mutual capacitance $C_{ds}$ between the excitation electrode 1 and the measurement electrode 2.

Thus, it is advantageously ensured that the mutual capacitance $C_{dg}$ between the excitation electrode 1 and the reference electrode 3 is not negligible and in particular should be taken into account in the model.

Alternatively or complementarily, the reference electrode 3 is advantageously arranged relative to the measurement electrode 2 so that, over the excitation frequency interval [f], the variation of the mutual capacitance $C_{sg}$ between the measurement electrode 2 and the reference electrode 3, this variation being denoted $\Delta C_{sg}$, meets:

$$\frac{1}{100} C_{ds} \leq \Delta C_{sg}$$

where, as already mentioned hereinabove, $C_{ds}$ is a value of the mutual capacitance between the excitation electrode 1 and the measurement electrode 2.

The shape of the reference electrode 3, the shape of the measurement electrode 2 and their relative position allows modifying the value of the mutual capacitance $C_{sg}$ between the measurement electrode 2 and the reference electrode 3.

Thus, it is advantageously ensured that the mutual capacitance $C_{sg}$ between the measurement electrode 2 and the reference electrode 3 is not negligible and in particular should be taken into account in the model.

Thus, either one or both of the two variations hereinabove could advantageously be limited. When they are both limited, it is ensured that both:

- the first electric current $i_1$-$i_g$ intended to circulate between the excitation 1 and measurement 2 electrodes via the medium MUT, and the second electric current $i_g$ intended to circulate between the excitation 1 and reference 3 electrodes via the medium MUT, are significant.

Advantageously, the control electronics 5 may further comprise a wireless communication module, preferably selected from among the Bluetooth®, Bluetooth® low-energy technologies (known by the acronym BLE), RFID, Wifi, LoRa® and Sigfox technologies.

Advantageously, the control electronics 5 includes a microcontroller. As will be seen hereinafter, the microcontroller of the control electronics 5 may be configured to further ensure the functions of the calculation unit 51 and of the processing unit 52.

Advantageously, the control electronics 5 are mounted on a printed circuit board PCB, as illustrated in FIGS. 11 to 13. The printed circuit board PCB may include electrically-conductive tracks forming the excitation electrode 1 and/or the measurement electrode 2.

Calculation Unit

Referring to FIGS. 11 to 13, the calculation unit 51, or computer, may advantageously be integrated into the control electronics 5. The calculation unit 51 may comprise or consist of the processor of the microcontroller of the control electronics 5.

The values of the equivalent electrical capacitance $C_x$ and of the equivalent conductance $G_x$ may be calculated by the calculation unit 51 according to the following formulae:

$$C_X = C_{fb} \times \frac{V_I}{V_d}$$

$$G_X = A \times C_{fb} \times f \times \frac{V_Q}{V_d}$$

where:

- $C_{fb}$ is a predetermined electrical capacitance, belonging to the feedback loop 501 of the operational amplifier 500,
- $V_I$ is the amplitude of the in-phase voltage measured at the output of the operational amplifier 500,
- $V_Q$ is the amplitude of the quadrature voltage measured at the output of the operational amplifier 500,
- $V_d$ is the amplitude of the electrical potential applied at the excitation electrode 1,
- f is the frequency of the electrical potential applied at the excitation electrode 1, and
- A is a constant related to the shape of the electrical potential applied at the excitation electrode 1.

For example, A=8 when the applied electrical potential has a square shape. The applied electrical potential may also have a rectangular or sinusoidal shape. As non-limiting examples, $C_{fb}$ may be equal to 47 pF or equal to 237 pF. $C_{fb}$ may belong to a branch of the feedback loop 501 parallel to the branch of said loop on which the regulator 502 is arranged.

A square-shaped electrical potential will be preferred for a frequency comprised between 10 KHz and 300 kHz. A sinusoidal shaped electrical potential will be preferred for a frequency comprised between 0.1 Hz and 100 KHz.

Processing Unit

Referring to FIGS. 11 to 13, the processing unit 52 may advantageously be integrated into the control electronics 5. The processing unit 52 may comprise or consist of the processor of the microcontroller.

As already mentioned hereinabove, the processing unit 52 of the characterisation device 0 may be configured to process the equivalent values calculated by the calculation unit 51, in order to determine:

- a capacitance value $C_m$ of the medium MUT at the measurement electrode 2 and/or a capacitance value $C_{mm}$ of the medium MUT at the reference electrode 3, and/or
- a conductance value $G_m$ of the medium MUT at the measurement electrode 2 and/or a conductance value $G_{mm}$ of the medium MUT at the reference electrode 3.
- by solving an equation or a system of equations translating the selected model of the behaviour of the characterisation system 10.

Electrical Model

The electrical model that underlies the processing algorithm is better understood on the basis of FIG. 15 and complementarily from FIG. 16.

The model described hereinbelow with reference to FIGS. 15 and 16 cleverly involves the different admittances "Y" to be modelled or that could be modelled, preferably at the different corresponding impedances "Z". Indeed, the admittances being proportional to the dielectric permittivities, and not to their inverse, it is thus more immediate to make the link between the model as illustrated in the aforementioned figures and as described hereinbelow, in particular with the use that can be done and which consists for example in extracting from the model the electrical conductivity σ of the medium MUT to be characterised, the latter defining in particular the imaginary part of the complex dielectric permittivity $\varepsilon^*(\omega)$ of the studied medium MUT.

FIG. 15 also shows currents injected for example by capacitive coupling(s) between electrodes isolated from the medium MUT to be characterised by a dielectric. The different couplings to be modelled or that could be modelled are denoted $C_{dm}$, $C_{ms}$ and $C_{mg}$.

One could note that, since the measurement electrode 2 is virtually grounded, the current $i_3$ is related to the excitation current I by the relationship $i_3 = I - i_g$ where $i_g$ is the current towards the reference electrode 3. Thus, the currents that cross the medium MUT to be characterised may be directed towards the reference electrode 3 and/or towards the measurement electrode 2. An essential aspect of the invention is then to take advantage of the fact that the currents $i_1 - i_g$ and $i_g$ depend on the complex permittivity $\varepsilon^*(\omega)$ of the studied medium, so that the capacitances $C_m$ of the medium MUT at the measurement electrode 2 and $C_{mm}$ of the medium MUT at the reference electrode 3, as well as the conductances $G_m$ at the measurement electrode 2 and $G_{mm}$ at the reference electrode 3, are proportional to the complex permittivity $\varepsilon^*(\omega)$ of the studied medium and are related thereto by factors related to the geometries of the electrodes and their relative arrangement.

Thus, on the basis of the notations of FIG. 15, the equivalent capacitance $C_x$ as calculated by the calculation unit 51 on the basis of the physical quantities measured by the electronic measurement circuit 50, may also be considered meeting the following relationship:

$$C_X = \mathrm{Im}\left\{\frac{1}{\omega}\frac{i_3}{V_d}\right\} = \mathrm{Im}\left\{\frac{1}{\omega}\frac{I}{V_d}\left[1 - \frac{i_g}{I}\right]\right\}, \text{ or}$$

$$C_X = \mathrm{Im}\left\{\frac{1}{\omega}[Y_{ds} + (Y_{dm} - -Y_{gs})] \cdot \left[1 - \frac{Y_g \cdot Y_{dm}}{(Y_{dm} + Y_{gs})} \cdot \frac{1}{\left[Y_{ds} + \left(Y_{dm} - -Y_{gs}\right)\right]}\right]\right\};$$

While the equivalent conductance $G_x$ as calculated by the calculation unit 51 on the basis of the physical quantities measured by the electronic measurement circuit 50, may also be considered as meeting the following relationship:

$$G_X = \mathrm{Re}\left\{\frac{i_3}{\mathrm{V}_d}\right\} = \mathrm{Re}\left\{\frac{I}{V_d}\left[1 - \frac{i_g}{I}\right]\right\}, \text{ or}$$

$$G_X = \mathrm{Re}\left\{[Y_{ds} + (Y_{dm} - -Y_{gs})] \cdot \left[1 - \frac{Y_g \cdot Y_{dm}}{(Y_{dm} + Y_{gs})} \cdot \frac{1}{[Y_{ds} + (Y_{dm} - -Y_{gs})]}\right]\right\};$$

Where the notation $Y_i—Y_j$ denotes the admittance equivalent to the two admittances $Y_i$ and $Y_j$ in series, so that $$Y_i - -Y_j = \frac{Y_i Y_j}{Y_i + Y_j}$$

and where $Y_{gs}=Y_s+Y_g$, $Y_s$ being as illustrated by FIG. 15 relating to the admittances of the currents at the measurement electrode 2 and $Y_g$ being as illustrated in FIG. 15 relating to the admittances of the leakage currents at the reference electrode 3, and where:

$$Y_s = Y_m + Y_{ms} \text{ where } Y_m = G_m + j\omega C_m \text{ and } Y_{ms} = j\omega C_{ms}$$

$$Y_g = Y_{mm} + Y_{mg} \text{ where } Y_{mm} = G_{mm} + j\omega C_{mm} \text{ and } Y_{mg} = j\omega C_{mg}$$

Figure 17:
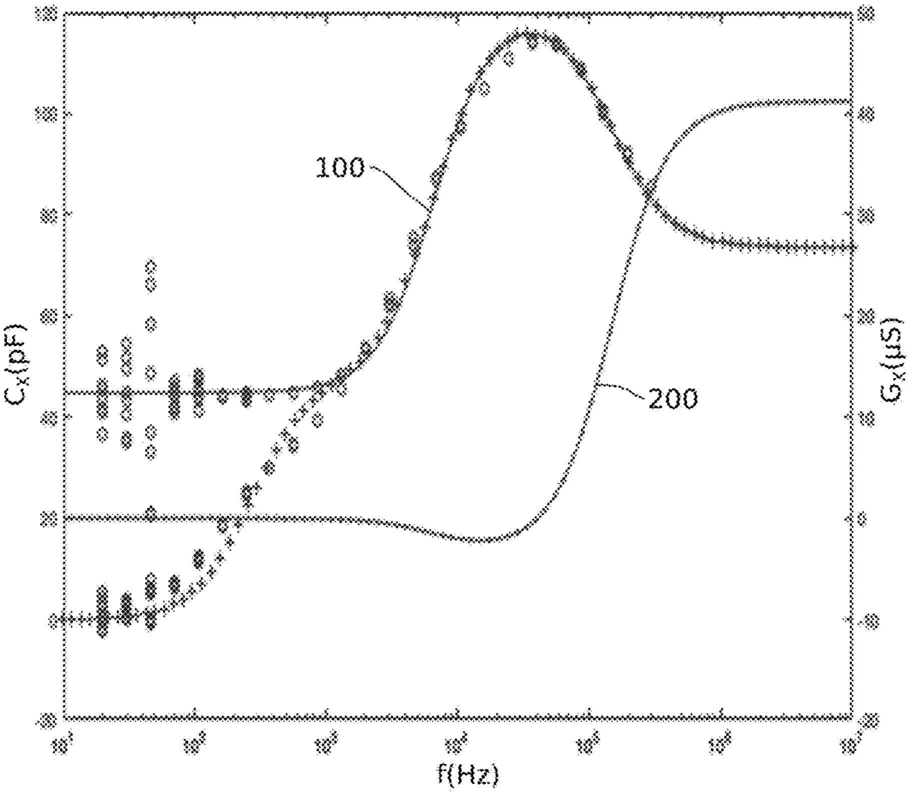
FIG. 17 is a graph representing the results of the characterisation by frequency capacitance spectroscopy of a volume of demineralised water using a characterisation system according to an embodiment of the second aspect of the symbols "+" representing the equivalent capacitance measurements for different measurement frequencies obtained with a control electrode imposing, on the volume of demineralised water, a potential connected to the ground, the circles "○" representing the equivalent capacitance measurements for different measurement frequencies without a control electrode, the continuous curve tightly adjusting a significant part of the equivalent capacitance measurements forming a model of the evolution of the equivalent capacitance $C_x$ as a function of the measurement frequency, and the remaining continuous curve forming a model of the evolution of the equivalent conductance $G_x$ as a function of the measurement frequency, each curve having been obtained by considering a model of the electrical behaviour of the characterisation system including a parallel setting of the equivalent capacitance $C_x$ and of the equivalent conductance $G_x$ (such setting in parallel being also shown in FIG. 14).

Such an approach has been used to model the result shown in FIG. 17, which is a frequency measurement using capacitors whose interdigitated electrodes are coated with a polyimide film with a volume of demineralised water, with and without a control electrode 8, as illustrated in FIG. 16, and a description of which is given by the patent document US 2020/0340844 A1 incorporated herein by reference.

In FIG. 17, the symbols "+" represent the equivalent capacitance measurements $C_x$ for different measurement frequencies obtained with a control electrode 8 imposing, on the volume of demineralised water, a potential connected to the ground. The circles "○" represent the equivalent capacitance measurements $C_x$ for different measurement frequencies, without a control electrode. For the frequencies lower than 300 Hz, one could observe an increasing dispersion of the measurements corresponding to less averaging thereof due to an acquisition time left constant over the entire frequency range.

One could observe that, in a so-called low-frequency mode substantially lower than 1,000 Hz, at which the demineralised water has an electrically-conductive nature, the value of $C_x$ becomes a non-zero constant related to the nature of the dielectric materials covering the excitation 1 and reference 3 electrodes, while this value tends towards 0 when the currents are essentially made towards the control electrode 8.

In FIG. 17, one could observe that a transient mode follows for frequencies substantially comprised between 1,000 Hz and 100,000 Hz, then a relatively stable mode for frequencies higher than 1 MHz. The transient mode is remarkable in that it is indicative of a partially electrically-conductive fluid, while the high-frequency mode is that one where the dielectric nature of distilled water dominates.

The continuous curve 100 closely adjusting a significant portion, for example selected according to some criteria, in particular to adjust only the measurements remote from those obtained with the control electrode 8 in the aforementioned first frequency mode, may be obtained in a known manner. This continuous curve 100 could then form a modelling of the evolution of the equivalent capacitance $C_x$ as a function of the measurement frequency over the considered interval.

For example, the continuous curve 200 is deducible from the continuous curve 100 so as to represent the evolution of the equivalent conductance $G_x$ as a function of the measurement frequency. Alternatively to such a deduction, the continuous curve 200 may be determined in the same way as the continuous curve 100, on the basis of an adjustment of measurements of the equivalent conductance $G_x$ over the considered frequency interval. The continuous curve 200 could then form a modelling of the evolution of the equivalent conductance $G_x$ as a function of the measurement frequency over the considered interval.

It arises from the foregoing that the models formed by the curves 100 and 200 contain the same information, meaning that each carries information complementary to that carried by the other; they can thus have a role of equal importance. Depending on the case, it could be preferred to benefit from the information carried by each of the two determined curves, separately from each other, or by deducing from each other, or to contend with the information carried by any one or a selected one amongst the two.

It should be noted that the curves 100 and 200 have been obtained by considering a modelling of the electrical behaviour of the characterisation system 10 including a parallel setting of the equivalent capacitance $C_x$ and of the equivalent conductance $G_x$ in the way illustrated in FIG. 14.

It should be noted that, alternatively to the model illustrated in FIG. 15 and described hereinabove, another model, illustrated in FIG. 19, arises when considering that the medium MUT to be characterised is electrically-conductive; this other model may fairly be considered to be a simplification of the more general model illustrated in FIG. 15.

As this will appear more clearly in particular in view of the description of FIGS. 18A, 18B, 19, 20A and 20B, a key of the approach exploited by the present invention lies in the fact that the quantities $G_m$ and $G_{mm}$, or $C_m$ and $C_{mm}$, differ from one another only by the geometric aspects (shape and dimensions of the electrodes, relative arrangement on a possible recipient, for example with more or less dielectric walls). This clearly appears in FIG. 16, which shows throughout the two 'branches' referenced $Y_m$ and $Y_{mm}$ of the current "paths" which depend, according to the proposed illustration, on the arrangement of the electrodes on the walls 60 of the recipient. In the same way as described before with regards to the models of the equivalent capacitance $C_x$ and of the equivalent conductance $G_x$, it should be understood that the modelling of the two above-mentioned 'branches' will be complementary to each other and carry information of the same richness.

This is a surprising observation identified by the Inventor, and on the exploitation of which, where appropriate, the solution currently proposed according to its different aspects is based in part.

Implementation

Any algorithm could be applied, possibly with an artificial intelligence logic and learning functions, allowing associating the processed values of $C_x$ and $G_x$ with a studied medium MUT, where appropriate, the characterisation device 0 or the characterisation system 10 having been calibrated beforehand, in the absence and/or in the presence of the studied medium MUT or of a medium MUT with known properties forming a reference medium for the medium MUT to be characterised.

A graphical representation could also be made, for example in the form of evolution of the quantities ε' and ε" as a function of the measurement frequency, or alternatively in the form of an evolution of one of these quantities as a function of the other one in a Cole-Cole representation.

Figure 20A:
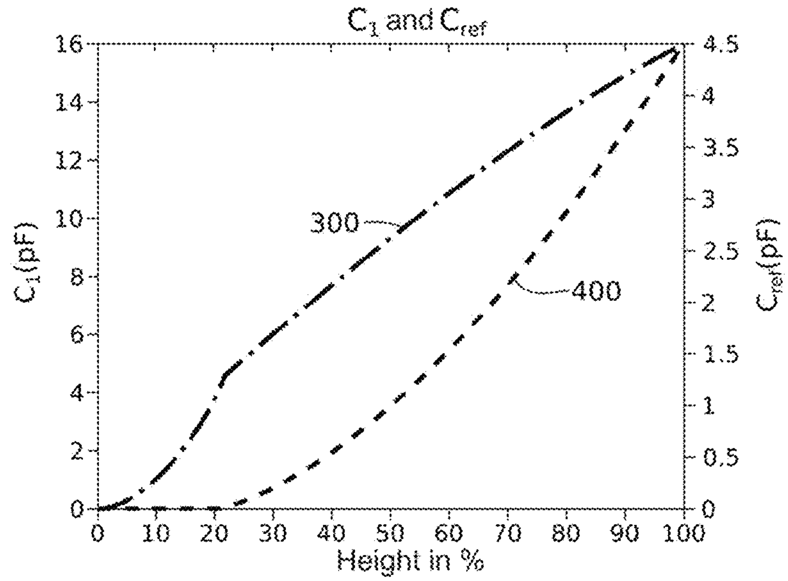
FIG. 20A shows a graph showing two curves obtained by numerical simulation, the upper curve, represented by symbols "•-•-•", is to be read on the ordinate referenced $C_{ref}$ and illustrates the evolution of the equivalent capacitance $C_x$ as a function of the level of the medium MUT in the tank, when the characterisation system is in the calibration configuration shown in FIG. 18A, and the lower curve, represented by symbols " - - - ", is to be read on the ordinate referenced $C_1$ and illustrates the evolution of the equivalent capacitance $C_x$ as a function of the level of the medium MUT in the tank, when the characterisation system is in the measurement configuration shown in FIG. 18B.
Figure 20B:
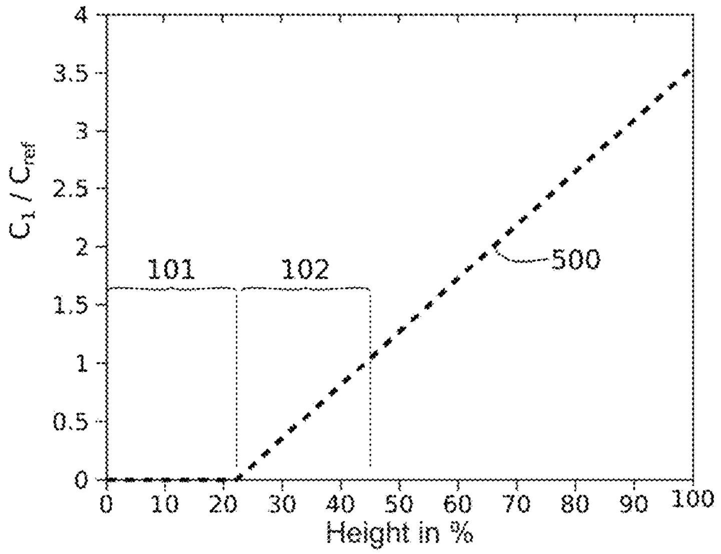
FIG. 20B shows a graph showing the evolution of the ratio $C_1/C_{ref}$ between the two curves of the graph of FIG. 20A, as a function of the level of the medium MUT in the tank.

As will be seen hereinbelow, FIG. 20B provides another example of such a graphical representation.

Container

A second aspect of the invention relates to a characterisation system 10 comprising a characterisation device 0 according to the first aspect of the invention and, where appropriate, a container 6. The latter is then preferably of the tank type (cf. FIGS. 11 and 13) or of the duct type (cf. FIG. 12), intended to receive a studied medium MUT.

Thus, the characterisation system 10 is formed by the arrangement of the characterisation device 0 relative to the container 6.

Referring to FIGS. 11 and 12, the container 6 may include:

a wall 60, arranged so as to separate the studied medium MUT from an outside environment, the wall 60 comprising:

an inner surface 600, directed towards the studied medium, coated, where appropriate, with a dielectric film;

an outer surface 601, opposite to the inner surface 600, and directed towards the outside environment; and a sealed case (not illustrated), made of a dielectric material, and extending inside the container 6, the sealed case being intended to be immersed in the studied medium MUT;

the characterisation device 0 being arranged inside the sealed case so that the excitation electrode 1 and the measurement electrode 2 generate an electric field inside the container 6.

Alternatively or complementarily, the container 6 may include:

a wall 60, arranged so as to separate the studied medium MUT from an outside environment, and made of a dielectric material, the wall 60 comprising:

an inner surface 600, directed towards the studied medium MUT;

an outer surface 601, opposite to the inner surface 600, and directed towards the outside environment; and a case (not illustrated), made of a dielectric material, and extending over the outer surface 601;

the characterisation device 0 being arranged inside the case so that the excitation electrode 1 and the measurement electrode 2 generate an electric field inside the container 6.

Preferably, the dielectric material from which the wall 60 is made is a plastic material or a composite material. As non-limiting examples, the plastic material may be polyethylene; the composite material may be a prepreg material, comprising a matrix (or resin) impregnating a reinforcement. The resin may be a thermosetting resin or a thermoplastic resin.

Referring to FIG. 13, the container 6 may include:

a wall 60, arranged so as to separate the studied medium from an outside environment, and made of a dielectric material; and at least one closed cavity, formed inside the wall 60; the device being arranged inside the closed cavity so that the excitation electrode 1 and the measurement electrode 2 generate an electric field inside the container 6.

Preferably, the dielectric material from which the wall 60 is made is a plastic material or a composite material. As non-limiting examples, the plastic material may be polyethylene; the composite material may be a prepreg material, comprising a matrix (or resin) impregnating a reinforcement. The resin may be a thermosetting resin or a thermoplastic resin.

The wall 60 comprises:

an inner surface 600, directed towards the studied medium MUT; and an outer surface 601, opposite to the inner surface 600, and directed towards the outside environment.

The closed cavity or cavities extend between the inner surface 600 and the outer surface 601 of the wall 60.

When the excitation electrode 1 and the measurement electrode 2 are interdigitated and have a spatial period, denoted λ, the excitation electrode 1 and the measurement electrode 2 are advantageously separated from the inner surface 600 of the wall 60 by a distance, denoted d, so that $\lambda \geq 4\pi d$.

Irrespective of the considered embodiment among the embodiments described hereinabove of the container 6, the latter may further comprise a radio-frequency identification tag (not illustrated) arranged inside the closed cavity. As a non-limiting example, the radio-frequency identification tag may be an RFID tag ("Radio Frequency IDentification" in English).

Moreover, the container 6 may advantageously comprise an energy recovery device 7 (as illustrated in FIGS. 11 to 13) configured to recover an energy originating from a source S, so as to electrically power the control electronics 5.

The source S may be an external source located in the outside environment. The external source S can emit radiofrequency waves. Advantageously, the external source S is selected from among:

a smartphone (as illustrated in FIG. 13), where appropriate, provided with a near-field communication module (NFC, standing for "Near Field Communication" in English), an antenna emitting a Bluetooth® Low Energy (BLE, standing for "Bluetooth® Low Energy" in English) type signal, or a Wi-Fi signal at 2.4 GHz or at 5 GHz.

It should be noted that a case may be provided on the container 6 in order to permanently receive the external source S. Alternatively, the source S may be arranged inside the closed cavity or inside the container 6.

The energy recovery device 7 is electrically connected to the microcontroller of the control electronics 5. Advantageously, the energy is selected from among electromagnetic energy, mechanical energy and thermal energy. As non-limiting examples, the source S may be an induction generator, a thermoelectric generator or a piezoelectric system.

Advantageously, the container 6 may further comprise storage means (not illustrated) for storing the energy recovered by the energy recovery device 7. As non-limiting examples, the storage means may include a battery or a supercapacitor (for example based on carbon).

Calibration

According to another one of its aspects, already mentioned hereinabove, the invention relates to a method for calibrating a characterisation device 0 or a characterisation system 10 according to the first two aspects of the invention.

Such a calibration may be based on two known situations, for example in the absence and/or in the presence of the studied medium MUT, and more particularly in the presence of a full tank 6 and an empty tank 6, the term "empty" as commonly understood refers to air or a gas whose relative permittivity is sufficiently close to 1 or known.

Alternatively or complementarily, such a calibration may be based on the presence, or the absence, of a medium MUT with known properties forming a reference medium for the medium MUT to be characterised.

Alternatively or complementarily, such a calibration may comprise a step of making the pulsation ω of the electrical potential applied at the excitation electrode 1 vary over at least one portion of an excitation pulse interval over which the medium MUT to be characterised is at least partially electrically-conductive.

Alternatively or complementarily, such a calibration may be based on a characterisation of the characterisation device 0 or of the characterisation system 10 according to the first two aspects of the invention by imposing on the excitation electrode 1 at least one amongst an excitation frequency at which the medium MUT to be characterised is electrically-conductive and an excitation frequency at which the medium MUT to be characterised is dielectric, and possibly one and then the other one of such frequencies.

Applications

According to another one of its aspects, already mentioned hereinabove, the invention relates to a method for characterising a medium MUT implementing a characterisation device 0 or a characterisation system 10 according to the first two aspects of the invention. The invention also relates to the use of the characterisation device 0 or of the characterisation system 0 to characterise a medium MUT.

Figure 18A:
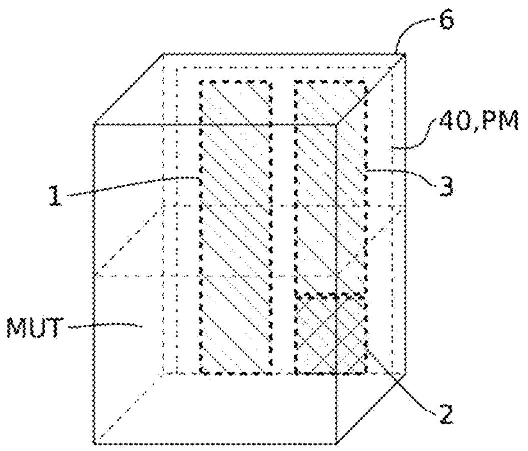
FIGS. 18A and 18B show partial schematic perspective views of a characterisation system according to an embodiment of the second aspect of the invention, the system as shown in FIG. 18*a* being in a calibration configuration, whereas the system as shown in FIG. 18*b* is in a configuration for measuring the level of the medium MUT in the tank; the ground planes PM acting as a shield with respect to the outside are not shown for readability.
Figure 18B:
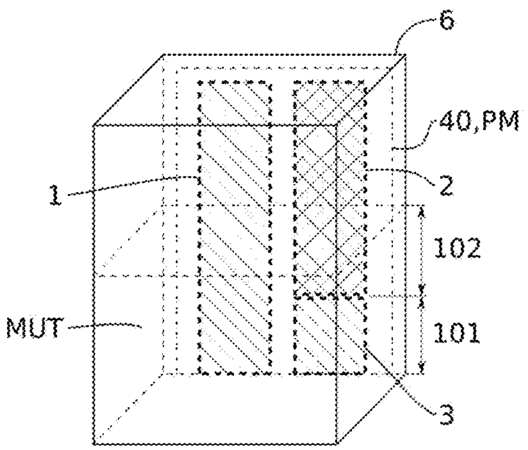

Referring to FIGS. 18A and 18B, an example of an application is described hereinbelow, as a non-limiting example, for a characterisation of a level of some essentially conductive media MUT (for example low-frequency aqueous solutions $f \ll f_c$) whose electrical behaviour can be modelled as illustrated in FIG. 19.

In this case, the characterisation device 0 may further comprise a switch arranged between the measurement 2 and reference 3 electrodes so as to successively carry out the two measurements $C_1$ and $C_{ref}$ according to configurations as shown in FIGS. 18A and 18B, while the surfaces and extension of the electrodes are defined, and are preferably arranged outside the recipient 6 containing the medium MUT.

The numerical simulation of the capacitance values $C_1$ and $C_{ref}$ as expected and observed in the present situation respectively give the evolutions 400 and 300 illustrated in the graph of FIG. 20A.

It is claimed that, in this case, the ratio $C_1/C_{ref}$ is proportional to the height of fluid, insofar as its level exceeds that 101 of the low reference and that the electrodes have the same width. This is clearly illustrated by the numerical simulation shown in FIG. 20B, showing the evolution of the ratio $C_1/C_{ref}$ as a function of the level of the medium MUT in the container 6.

The same applies if the configuration involves an extended measurement electrode 2 and two excitation electrodes 1 that can be grounded.

As other non-limiting examples, mention may be made as specific applications:

- the characterisation of a cell medium MUT, for example in a bioreactor and/or in terms of its cell concentration;
- the quality of a partially electrically-conductive liquid MUT, and for example a food liquid, such as a full-cream or semi-skimmed milk;
- the state of an electrolyte MUT, for example in a battery;
- the characterisation of a complex aqueous medium MUT, for example in a sludge trap of a wastewater treatment plant, in particular in terms of sludge concentration; and
- the quality of a mixture containing water and a diesel exhaust fluid containing 32.5% high-purity urea and 67.5% deionized water MUT, for example in a tank.

Thus, the invention is applicable not only to fluid media MUT, but also to a variety of complex media MUT like:

- Aqueous media with different ionic concentrations of foreign species;
- Biological media (cells and extracellular fluids);
- Suspensions (cells, bacteria, lipids, yeasts, etc.); and
- Gels (food, batteries, etc.).

Such media could play a particular role for biochemistry and electrochemistry, it being understood that the invention finds particularly advantageous applications in these technical fields.

In the case of the human body, the measurement that the invention enables is so-called bio-impedance and its use allows in particular accessing the fatty mass, under some assumptions.

To illustrate the aforementioned examples of application, lets develop hereinbelow the case of a studied medium MUT consisting of a complex aqueous medium, like those that are found, for example, in a sludge trap of a wastewater treatment plant. It is then possible to distinguish three modes:

- the lowest frequencies ($f \ll f_c$) which allow characterising in particular the presence of colloidal particles giving rise to double electrical layers,
- the intermediate frequencies ($f \approx f_c$) which allow characterising the conductivity of the studied medium MUT,
- the high frequencies ($f \gg f_c$) which allow characterising the dielectric response of the different species present in the studied medium MUT.

Thus, it arises that the characterisation device 0 can allow, alternatively to or complementarily with other applications, such as that one consisting in characterising a level of the medium MUT in its recipient, evaluating properties of interest of the studied medium MUT crossed by the electric field generated by the excitation electrode 1 and the measurement electrode 2, and thereby allows informing on essential aspects of the studied medium MUT, such as its composition, by frequency response.

Moreover, the method for characterising a medium MUT implementing a characterisation device 0 or a characterisation system 0 according to the first two aspects of the invention may comprise a step of making the pulsation ω of the electrical potential applied at the excitation electrode 1 vary over at least one portion of an interval over which the medium MUT intended to be characterised or to be characterised is at least partially electrically-conductive.

Conductivity Meter

Another aspect of the invention relates to a conductivity meter comprising a characterisation system 0 according to the second aspect of the invention, wherein a quantity $-\tan(\delta)=-G_x/(\omega C_x)$ is determined to deduce a characteristic frequency proportional to the conductivity of the medium MUT contained in the container 6. More particularly, the quantity $-\tan(\delta)=-G_x/(\omega C_x)$ is determined as a function of the equivalent electrical capacitance value, denoted $C_x$, and the equivalent conductance value, denoted $G_x$, between the excitation and measurement electrodes 1 and 2, as determined by implementation of the characterisation device according to the first aspect of the invention.

Indeed, use may be made of the equivalent electrical capacitance $C_x$ and the equivalent conductance $G_x$ determined by implementation of the characterisation device according to the first aspect of the invention to calculate an electrical quantity $\tan(\delta)=G_x/(C_x)$ representative of the dissipation of the medium MUT. And, if we define $\omega_c=\sigma/\varepsilon'$ as the critical pulsation for which the real and complex permittivities of the medium MUT have the same value, it is notable that the quantity tan(δ) has a universal form as a function of the quantity $\omega/\omega_c$ or approaches it so as to be able to be modelled thanks to the model of the invention. Thus, preferably by judiciously selectively the electrode surfaces so that the capacitive coupling $C_{mg}$ created between the reference electrode and the medium MUT is higher than the capacitive coupling $C_{ms}$ created between the measurement electrode and the medium MUT (i.e. $C_{mg}>C_{ms}$), the curves obtained by the model follow relatively well the measurements illustrated in FIG. 21 representing the opposite −tan(δ) of the aforementioned electrical quantity as a function of the frequency, the position of which is proportional to the conductivity of the medium MUT.

Figure 21:
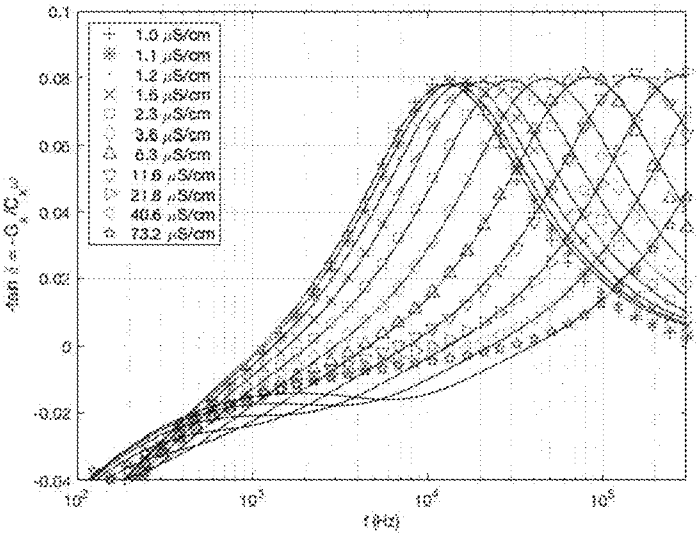
FIG. 21 shows the evolution of a quantity $-\tan\delta$ as a function of frequency for a tank having walls made of polyethylene with a thickness of 1 mm equipped with sets of measurement electrodes of the characterisation device according to the first aspect of the invention. The different curves formed of discrete symbols are the measurements corresponding to increasing conductivities of the water contained in the reservoir, obtained by dilution of water with a conductivity of 404 μS/cm in de-ionised water with a conductivity of 1 μS/cm. The continuous curves are derived from the model described in the invention.

More particularly, the different series of measurements illustrated in FIG. 21 have been obtained by progressive dilution of drinking water with a conductivity equal to 404 µS/cm in de-ionised water with an initial conductivity equal to 1.0 µS/cm. The continuous curves are obtained from the model and it is observed that they correspond to the series of conductivity values of the measurement points. It is also observed that the central portion of the curves shifts in frequency in a manner proportional to the conductivity associated therewith.

Figure 22:
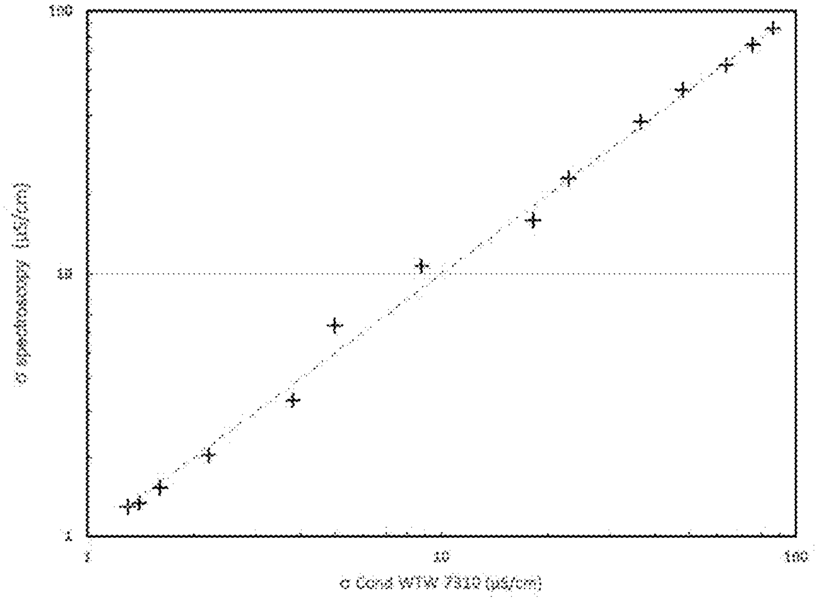
FIG. 22 allows comparing the conductivities obtained from a characteristic point (herein the positive slope inflection point under conditions similar to FIG. 21) to the conductivities obtained by direct measurement in the medium MUT by a commercial apparatus.

FIG. 22 illustrates the evolution of the ratio, two-by-two, between:

- the measurements obtained on a tank made of HDPE equipped with the electrodes of the characterisation device according to the first aspect of the invention for which a positive slope inflection point of each curve illustrated in FIG. 21 is used to deduce the conductivity of the water contained in the characterisation system; they are more particularly given by the relationship 1.3+0.00030014*(f−3,016), where the frequency f is expressed in Hz, and the measurements obtained by a commercial conductivity meter (Model Cond 7310 from the WTW® brand), for each of the dilutions considered in FIG. 21.

In FIG. 22 where the conductivity scales are logarithmic, these measurements are comparable; one could see that each ratio between two corresponding measurements is substantially inscribed on a unit slope ramp (the dotted curve has a 1 slope), thereby demonstrating the robustness of the characterisation offered by the different aspects of the invention and the possibility for the characterisation system according to the second aspect of the invention to form a conductivity meter.

The invention is not limited to the disclosed embodiments and extends to all of the embodiments covered by the claims. A person skilled in the art is able to consider their technically-feasible combinations, and to substitute them with equivalents.

The invention claimed is:

1. A device for characterizing a medium MUT by capacitance spectroscopy, comprising:

- an excitation electrode and a measurement electrode, each having a determined geometry and intended to be arranged relative to one another so as to form a capacitor,
- a reference electrode having a determined geometry and defining a reference electrical potential $V_g$,
- control electronics configured to apply an electrical potential $V_d$ to the excitation electrode, and
- an electronic measurement circuit having a virtual ground $V_0$ directly connected to the measurement electrode;

wherein:

- the excitation, measurement and reference electrodes are intended to be arranged relative to one another and relative to the medium MUT intended to be characterised according to an arrangement such that:
- the control electronics are configured to make the electrical potential $V_d$ at the excitation electrode vary over time with a pulsation ω selected so that the medium MUT intended to be characterised is at least partially electrically-conductive,
- the excitation and measurement electrodes are arranged so as to enable a first electric current, denoted $i_1-i_g$, to circulate therebetween via the medium MUT, and
- the excitation and reference electrodes are arranged so as to enable a second electric current, denoted $i_g$, to circulate therebetween via the medium MUT;

So that at least one amongst the following capacitive couplings is created:

- a capacitive coupling $C_{dm}$ between the excitation electrode and the medium MUT,
- a capacitive coupling $C_{ms}$ between the measurement electrode and the medium MUT, and
- a capacitive coupling $C_{mg}$ between the reference electrode and the medium MUT;

wherein:

- the electronic measurement circuit is configured to measure physical quantities representative of a current, denoted $i_3$, originating from the excitation electrode and reaching the measurement electrode;

the characterisation device further comprises:

- a calculation unit configured to calculate at least one amongst an equivalent electric capacitance value, denoted $C_x$, and an equivalent conductance value, denoted $G_x$, between the excitation and measurement electrodes, at least from the physical quantities measured by the measurement electronic circuit; and
- a processing unit configured to process each value which, amongst the values of the equivalent electric capacitance $C_x$ and the equivalent conductance $G_x$, has been calculated by the calculation unit, to determine at least one amongst a capacitance value $C_m$ of the medium MUT at the measurement electrode and a capacitance value $C_{mm}$ of the medium MUT at the reference electrode and/or at least one amongst a conductance value $G_m$ of the medium MUT at the measurement electrode and a conductance value $G_{mm}$ of the medium MUT at the reference electrode, by solving a system of at least one equation built based on a modelling of the electrical behaviour of a characterisation system comprising at least the characterisation device, each equation interconnecting:
- a determined one of the values which, amongst the values of the equivalent electric capacitance $C_x$ and the equivalent conductance $G_x$, has been calculated by the calculation unit,
- at least that one amongst the capacitance $C_m$ of the medium MUT at the measurement electrode and the capacitance $C_{mm}$ of the medium MUT at the reference electrode is to be determined,
- at least the highest value amongst a value of the capacitive coupling $C_{dm}$ created between the excitation electrode and the medium MUT, a value of the capacitive coupling $C_{ms}$ created between the measurement electrode and the medium MUT and a value of the capacitive coupling $C_{mg}$ created between the reference electrode and the medium MUT,
- a pulsation value ω of the electrical potential $V_d$ at the excitation electrode, and a conductivity $\sigma$ of the medium MUT to be characterised, at least one amongst the characterization device and the characterization system having been calibrated beforehand for said determined geometries of the electrodes and said arrangement.

2. The characterization device according to claim 1, wherein said at least one equation of said system is further dependent on a mutual capacitance value $C_{ds}$ between the excitation electrode and the measurement electrode.

3. The characterization device according to claim 1, wherein the processing unit is further configured to determine, according to each one amongst the capacitance value $C_m$ of the medium MUT at the measurement electrode and the capacitance value $C_{mm}$ of the medium MUT at the reference electrode having been determined, and possibly, where appropriate, according to each one amongst the conductance value $G_m$ of the medium MUT at the measurement electrode and the conductance value $G_{mm}$ of the medium MUT at the reference electrode having been determined, the values representative of the complex dielectric permittivity $\varepsilon'(\omega)$ of the medium MUT.

4. The characterization device according to claim 1, wherein the processing unit is further configured to determine, according to each one amongst the capacitance value $C_m$ of the medium MUT at the measurement electrode and the capacitance value $C_{mm}$ of the medium MUT at the reference electrode having been determined, and possibly, where appropriate, according to each one amongst the conductance value $G_m$ of the medium MUT at the measurement electrode and the conductance value $G_{mm}$ of the medium MUT at the reference electrode having been determined, at least one value representative of a contact surface between:

at least one amongst the excitation, measurement and reference electrodes, in particular the measurement electrode, and the medium MUT.

5. The characterization device according to claim 1 wherein:

the reference electrode is coated with a dielectric material so as to create the capacitive coupling $C_{mg}$ between the reference electrode and the medium MUT; and the processing unit is configured to process each value which, amongst the values of the equivalent electric capacitance $C_x$ and the equivalent conductance $G_x$, has been calculated by the calculation unit, at least according to the value of the capacitive coupling $C_{mg}$ between the reference electrode and the medium MUT created by coating, with the dielectric material, the reference electrode.

6. The characterization device according to claim 1, wherein:

at least one amongst the excitation electrode and the measurement electrode is coated with a dielectric material, so as to create, respectively, the capacitive coupling $C_{dm}$ between the excitation electrode and the medium MUT and the capacitive coupling $C_{ms}$ between the measurement electrode and the medium MUT;

the processing unit is configured to process each value which, amongst the values of the equivalent electric capacitance $C_x$ and the equivalent conductance $G_x$, has been calculated by the calculation unit, at least according to the value of each capacitive coupling which, amongst the capacitive coupling $C_{dm}$ between the excitation electrode and the medium MUT and the capacitive coupling $C_{ms}$ between the measurement electrode and the medium MUT, has been created by coating, with the dielectric material, a corresponding one amongst the excitation electrode and the measurement electrode.

7. The characterization device according to claim 1, wherein the arrangement of the excitation electrode relative to the reference electrode is further such that a variation of the mutual capacitance between the excitation electrode and the reference electrode, denoted $\Delta C_{dg}$, meets:

$$\frac{1}{100}C_{ds} \leq \Delta C_{dg}$$

where $C_{ds}$ is a value representative of the mutual capacitance between the excitation electrode and the measurement electrode.

8. The characterization device according to claim 1, wherein the arrangement of the measurement electrode relative to the reference electrode is further such that the variation of the mutual capacitance between the measurement electrode and the reference electrode, denoted $\Delta C_{sg}$, meets:

$$\frac{1}{100}C_{ds} \leq \Delta C_{sg}$$

where $C_{ds}$ is a value representative of the mutual capacitance between the excitation electrode and the measurement electrode.

9. The characterization device according to claim 1, wherein the electronic measurement circuit includes an operational amplifier, mounted as an inverter, and comprising:

a non-inverting input, connected to the reference electrode, an inverting input, connected to the measurement electrode, an output, where the physical quantities are measured, and a feedback loop, connecting the output to the inverting input.

10. The characterization device according to claim 9, wherein the feedback loop includes a regulator configured so that the operational amplifier operates in a linear mode.

11. The characterization device according to claim 9, wherein the measurement electronic circuit is configured to measure an in-phase voltage amplitude $V_I$ and a quadrature voltage amplitude $V_Q$ at the output of the operational amplifier, said physical quantities comprising, and possibly consisting of, the in-phase voltage amplitude $V_I$ and the quadrature voltage amplitude $V_Q$.

12. The characterization device according to claim 9, wherein the equivalent electrical capacitance $C_X$ is calculated by the calculation unit according to the following formula:

$$C_X = C_{fb} \times \frac{V_I}{V_r}$$

where:

$C_{fb}$ is a predetermined electrical capacitance, belonging to the feedback loop of the operational amplifier, $V_I$ is an amplitude of the measured in-phase voltage at the output of the operational amplifier, and $V_Q$ is an amplitude of the quadrature voltage measured at the output of the operational amplifier.

13. The characterization device according to claim 9, wherein the equivalent conductance $G_X$ is calculated by the calculation unit according to the following formula:

$$G_X = A \times C_{fb} \times f \times \frac{V_Q}{V_r}$$

where:

$C_{fb}$ is a predetermined electrical capacitance, belonging to the feedback loop of the operational amplifier, $V_I$ is an amplitude of the measured in-phase voltage at the output of the operational amplifier, $V_Q$ is an amplitude of the quadrature voltage measured at the output of the operational amplifier, $V_d$ is the electrical potential applied at the excitation electrode, f is the frequency of the electrical potential $V_d$ applied at the excitation electrode such that $\omega=2\pi f$, where $\omega$ is the pulsation of the electrical potential $V_d$ at the excitation electrode, and A is a constant related to the shape of the electrical potential applied at the excitation electrode.

14. The characterization device according to claim 1, wherein the capacitor formed by the excitation electrode and the measurement electrode is selected from among a parallel plate capacitor, an interdigitated electrode capacitor, a coaxial cylinder capacitor.

15. The characterization device according to claim 1, wherein the control electronics are configured to apply an electrical potential at the excitation electrode according to a selected fixed frequency so that the medium (MUT) intended to be characterised is electrically-conductive at said fixed frequency.

16. The characterization device according to claim 1, wherein the control electronics are configured to make the pulsation $\omega$ of the electrical potential applied at the excitation electrode 1 vary over at least one portion of an interval over which the medium MUT intended to be characterised is at least partially electrically-conductive, said variation consisting, where appropriate, in scanning said interval.

17. The characterization device according to claim 1, further comprising a switch and a control electrode whose potential is alternately left floating or connected to the control electronics by the switch.

18. The characterization device according to claim 1, further comprising a switch arranged between the measurement and reference electrodes.

19. A characterization system comprising at least one characterization device according to claim 1 and a container intended to receive a medium MUT to be characterized.

20. The characterization system according to claim 19, wherein the container comprises:

a wall, arranged so as to separate the studied medium MUT from an outside environment, the wall comprising:

an inner surface, directed towards the studied medium MUT, coated, where appropriate, with a dielectric film;

an outer surface, opposite to the inner surface, and directed towards the outside environment;

a sealed case, made of a dielectric material, and extending inside the container, the sealed case being intended to be immersed in the studied medium MUT;

the characterization device being arranged inside the sealed case so that the excitation electrode and the measurement electrode generate an electric field inside the container.

21. The characterization system according to claim 19, wherein the container comprises:

a wall, arranged so as to separate the studied medium MUT from an outside environment, and made of a dielectric material, the wall comprising:

an inner surface, directed towards the studied medium MUT;

an outer surface, opposite to the inner surface, and directed towards the outside environment;

a case, made of a dielectric material, and extending over the outer surface;

the characterization device being arranged inside the case so that the excitation electrode and the measurement electrode generate an electric field inside the container.

22. The characterization system according to claim 19, wherein the container comprises:

a wall, arranged so as to separate the studied medium MUT from an outside environment, and made of a dielectric material;

at least one closed cavity, formed inside the wall;

the characterization device being arranged inside the closed cavity so that the excitation electrode and the measurement electrode generate an electric field inside the container.

23. A conductivity meter comprising a characterization system according to claim 19, wherein a quantity $-\tan(\delta)=-G_x/(\omega C_x)$ is determined to deduce a characteristic frequency proportional to the conductivity of the medium MUT contained in the container.

24. A method for calibrating a characterization device for characterizing a medium MUT by capacitance spectroscopy, the method comprising:

providing a characterization device; and calibrating the characterization device for determined geometries of electrodes and an arrangement of the electrodes;

wherein the characterization device comprises:

an excitation electrode and a measurement electrode, each having a determined geometry and intended to be arranged relative to one another so as to form a capacitor, a reference electrode having a determined geometry and defining a reference electrical potential $V_g$, control electronics configured to apply an electrical potential $V_d$ to the excitation electrode, and an electronic measurement circuit having a virtual ground $V_0$ directly connected to the measurement electrode;

wherein:

the excitation, measurement and reference electrodes are intended to be arranged relative to one another and relative to the medium MUT intended to be characterised according to an arrangement such that:

the control electronics are configured to make the electrical potential $V_d$ at the excitation electrode vary over time with a pulsation $\omega$ selected so that the medium MUT intended to be characterised is at least partially electrically-conductive, the excitation and measurement electrodes are arranged so as to enable a first electric current, denoted $i_1-i_g$, to circulate therebetween via the medium MUT, and the excitation and reference electrodes are arranged so as to enable a second electric current, denoted $i_g$, to circulate therebetween via the medium MUT;

so that at least one amongst the following capacitive couplings is created:

a capacitive coupling $C_{dm}$ between the excitation electrode and the medium MUT, a capacitive coupling $C_{ms}$ between the measurement electrode and the medium MUT, and a capacitive coupling $C_{mg}$ between the reference electrode and the medium MUT;

wherein:

the electronic measurement circuit is configured to measure physical quantities representative of a current, denoted 13, originating from the excitation electrode and reaching the measurement electrode;

the characterization device further comprises:

a calculation unit configured to calculate at least one amongst an equivalent electric capacitance value, denoted $C_x$, and an equivalent conductance value, denoted $G_x$, between the excitation and measurement electrodes, at least from the physical quantities measured by the measurement electronic circuit; and a processing unit configured to process each value which, amongst the values of the equivalent electric capacitance $C_x$ and the equivalent conductance $G_x$, has been calculated by the calculation unit, to determine at least one amongst a capacitance value $C_m$ of the medium MUT at the measurement electrode and a capacitance value $C_{mm}$ of the medium MUT at the reference electrode and/or at least one amongst a conductance value $G_m$ of the medium MUT at the measurement electrode and a conductance value $G_{mm}$ of the medium MUT at the reference electrode, by solving a system of at least one equation built based on a modelling of the electrical behaviour of a characterisation system comprising at least the characterisation device, each equation interconnecting:

a determined one of the values which, amongst the values of the equivalent electric capacitance $C_x$ and the equivalent conductance $G_x$, has been calculated by the calculation unit, at least that one amongst the capacitance $C_m$ of the medium MUT at the measurement electrode and the capacitance $C_{mm}$ of the medium MUT at the reference electrode is to be determined, at least the highest value amongst a value of the capacitive coupling $C_{dm}$ created between the excitation electrode and the medium MUT, a value of the capacitive coupling $C_{ms}$ created between the measurement electrode and the medium MUT and a value of the capacitive coupling $C_{mg}$ created between the reference electrode and the medium MUT, a pulsation value $\omega$ of the electrical potential $V_d$ at the excitation electrode, and a conductivity $\sigma$ of the medium MUT to be characterized.

25. The calibration method according to claim 24, comprising a step of making the pulsation $\omega$ of the electrical potential applied at the excitation electrode vary over at least one portion of an interval over which the medium MUT intended to be characterised is at least partially electrically-conductive.

26. A method for characterizing a medium MUT by capacitance spectroscopy, the method comprising:

providing a characterization device; and characterizing the medium MUT using the characterization device;

wherein the characterization device comprises:

an excitation electrode and a measurement electrode, each having a determined geometry and intended to be arranged relative to one another so as to form a capacitor, a reference electrode having a determined geometry and defining a reference electrical potential $V_e$, control electronics configured to apply an electrical potential $V_d$ to the excitation electrode, and an electronic measurement circuit having a virtual ground $V_o$ directly connected to the measurement electrode;

wherein:

the excitation, measurement and reference electrodes are intended to be arranged relative to one another and relative to the medium MUT intended to be characterised according to an arrangement such that:

the control electronics are configured to make the electrical potential $V_d$ at the excitation electrode vary over time with a pulsation $\omega$ selected so that the medium MUT intended to be characterised is at least partially electrically-conductive, the excitation and measurement electrodes are arranged so as to enable a first electric current, denoted $i_1$-$i_e$, to circulate therebetween via the medium MUT, and the excitation and reference electrodes are arranged so as to enable a second electric current, denoted $i_g$, to circulate therebetween via the medium MUT;

so that at least one amongst the following capacitive couplings is created:

a capacitive coupling $C_{dm}$ between the excitation electrode and the medium MUT, a capacitive coupling $C_{ms}$ between the measurement electrode and the medium MUT, and a capacitive coupling $C_{mg}$ between the reference electrode and the medium MUT;

wherein:

the electronic measurement circuit is configured to measure physical quantities representative of a current, denoted $i_3$, originating from the excitation electrode and reaching the measurement electrode;

the characterization device further comprises:

a calculation unit configured to calculate at least one amongst an equivalent electric capacitance value, denoted $C_x$, and an equivalent conductance value, denoted $G_x$, between the excitation and measurement electrodes, at least from the physical quantities measured by the measurement electronic circuit; and a processing unit configured to process each value which, amongst the values of the equivalent electric capacitance C, and the equivalent conductance $G_x$, has been calculated by the calculation unit, to determine at least one amongst a capacitance value $C_m$ of the medium MUT at the measurement electrode and a capacitance value $C_{mm}$ of the medium MUT at the reference electrode and/or at least one amongst a conductance value $G_m$ of the medium MUT at the measurement electrode and a conductance value $G_{mm}$ of the medium MUT at the reference electrode, by solving a system of at least one equation built based on a modelling of the electrical behaviour of a characterisation system comprising at least the characterisation device, each equation interconnecting:

a determined one of the values which, amongst the values of the equivalent electric capacitance C, and the equivalent conductance $G_x$, has been calculated by the calculation unit, at least that one amongst the capacitance $C_m$ of the medium MUT at the measurement electrode and the capacitance $C_{mm}$ of the medium MUT at the reference electrode is to be determined, at least the highest value amongst a value of the capacitive coupling $C_{dm}$ created between the excitation electrode and the medium MUT, a value of the capacitive coupling $C_{ms}$ created between the measurement electrode and the medium MUT and a value of the capacitive coupling $C_{mg}$ created between the reference electrode and the medium MUT, a pulsation value ω of the electrical potential $V_d$ at the excitation electrode, and a conductivity σ of the medium MUT to be characterised, at least one amongst the characterization device and the characterization system having been calibrated beforehand for said determined geometries of the electrodes and said arrangement.

27. The characterization method according to claim 26, comprising a step of making the pulsation ω of the electrical potential applied at the excitation electrode vary over at least one portion of an interval over which the medium MUT intended to be characterised is at least partially electrically-conductive.

28. The characterization method according to claim 26, wherein the medium MUT intended to be characterized is selected from among:

a cell medium;

a partially electrically-conductive liquid, and for example a food liquid, such as a full-cream or semi-skimmed milk;

an electrolyte;

a complex aqueous medium; and a mixture containing water and a diesel exhaust fluid containing 32.5% high-purity urea and 67.5% deionized water.

* * * * *